United States Patent
Chauhan et al.

(10) Patent No.: US 12,493,341 B2
(45) Date of Patent: Dec. 9, 2025

(54) AVOIDING DAMAGE TO UNIVERSAL SERIAL BUS SINK SWITCH DEVICE

(71) Applicant: Intel Corporation, Santa Clara, CA (US)

(72) Inventors: Shailendra Singh Chauhan, Bangalore (IN); Venkata Mahesh Gunnam, Yeditha (IN); Venkataramana Kotakonda, Bangalore (IN); Chuen Ming Tan, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 18/328,301

(22) Filed: Jun. 2, 2023

(65) Prior Publication Data

US 2023/0409105 A1  Dec. 21, 2023

(30) Foreign Application Priority Data

Jun. 8, 2022 (IN) .............................. 202241032744

(51) Int. Cl.
*G06F 1/00* (2006.01)
*G06F 1/3215* (2019.01)
*G06F 1/3296* (2019.01)

(52) U.S. Cl.
CPC .......... *G06F 1/3296* (2013.01); *G06F 1/3215* (2013.01)

(58) Field of Classification Search
CPC ...... G06F 1/3296; G06F 1/3215; G06F 1/206; G06F 1/263; G06F 1/28; G06F 1/266
See application file for complete search history.

(56) References Cited

U.S. PATENT DOCUMENTS

| | | | |
|---|---|---|---|
| 6,624,994 B1 * | 9/2003 | Schmoock | H03K 17/0822 323/908 |
| 10,530,249 B1 * | 1/2020 | Lee | H02M 1/08 |
| 2006/0261788 A1 * | 11/2006 | May | H02M 1/32 323/273 |
| 2014/0077777 A1 * | 3/2014 | Vemula | G05F 1/56 323/280 |
| 2014/0208134 A1 * | 7/2014 | Waters | G06F 13/4282 713/310 |
| 2017/0235351 A1 * | 8/2017 | Zhou | G06F 1/263 713/300 |
| 2017/0317583 A1 * | 11/2017 | Forghani-Zadeh | H03K 17/04206 |
| 2021/0408803 A1 * | 12/2021 | Natarajan | H02J 7/00034 |

(Continued)

*Primary Examiner* — Xuxing Chen
(74) *Attorney, Agent, or Firm* — Schwabe, Williamson & Wyatt, P.C.

(57) ABSTRACT

Embodiments herein relate to avoiding damage to a transistor in a power-sinking device that receives power from an external power source via a Universal Serial Bus port. In one aspect, a controller of the device sets a current limit to a reduced level during a wait period after the external power source is connected to the power-sinking device. The wait period avoids damage to the transistor by allowing its input and output voltages to equalize before the current is increased. Upon expiration of the wait period, the current limit is increased to a level negotiated with the external power source. Other aspects involve considering a sleep or low/dead battery state of the power-sinking device. The current limit can be set by programming a current limit of a battery charger coupled to between the transistor and a power bus of the device.

20 Claims, 17 Drawing Sheets

(56) References Cited

U.S. PATENT DOCUMENTS

2022/0350389 A1* 11/2022 Soffer .................. G06F 1/3215
2024/0025287 A1* 1/2024 Mouchet ............. H02J 7/00304

* cited by examiner

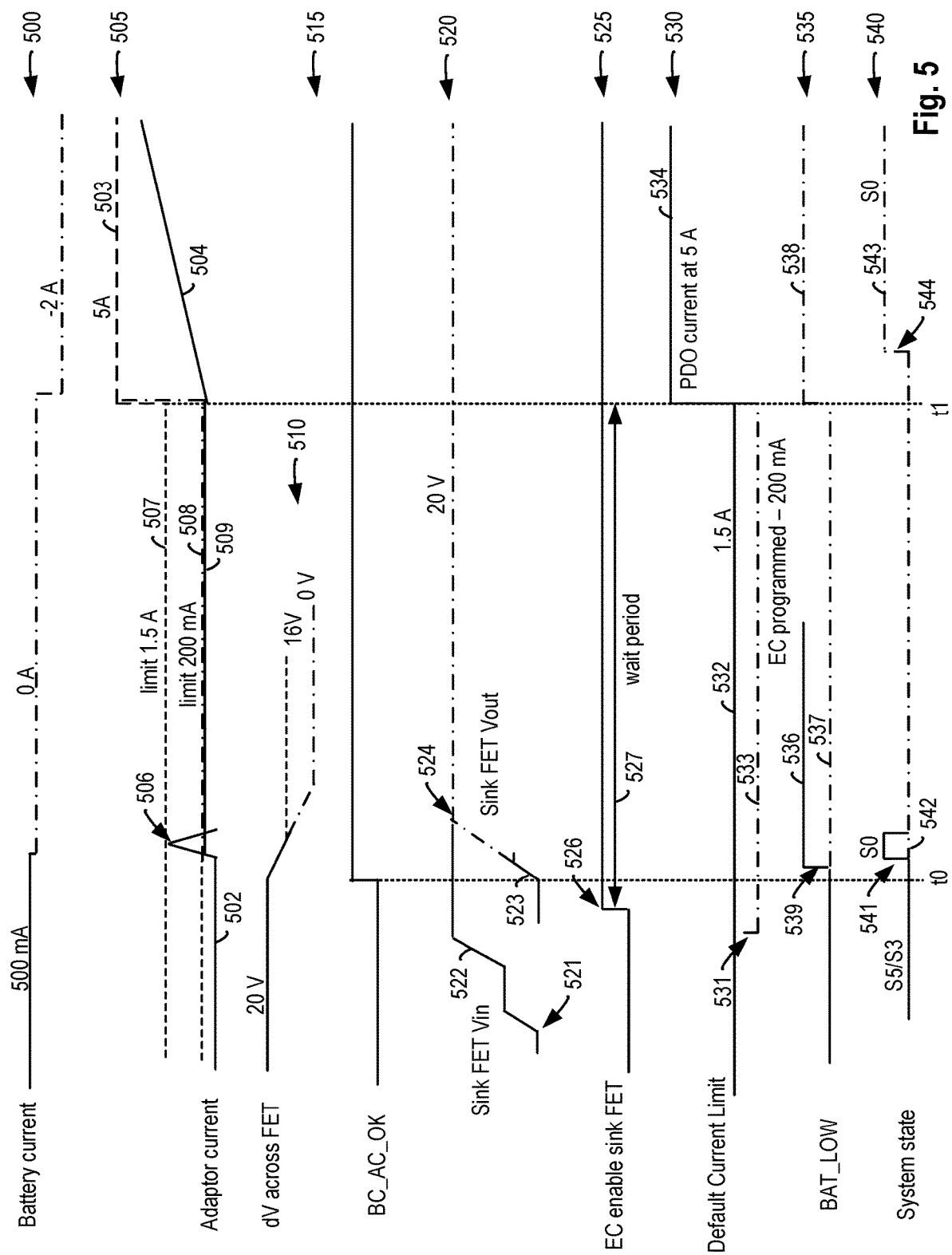

```
┌─────────────────────────────────────────────────────────────────────┐
│ Identifying that the system has been coupled with a power source    │
│ by a USB Type-C (USB-C) port of the system                          │
│                            605                                      │
└─────────────────────────────────────────────────────────────────────┘
                                  │
                                  ▼
┌─────────────────────────────────────────────────────────────────────┐
│ Identifying a power state of the system in response to the          │
│ identification that the system has been coupled with the power      │
│ source                                                              │
│                            610                                      │
└─────────────────────────────────────────────────────────────────────┘
                                  │
                                  ▼
┌─────────────────────────────────────────────────────────────────────┐
│ Identifying one or more voltage parameters related to a field       │
│ effect transistor (FET) communicatively coupled with the USB-C port │
│                            615                                      │
└─────────────────────────────────────────────────────────────────────┘
                                  │
                                  ▼
┌─────────────────────────────────────────────────────────────────────┐
│ Identifying a charger input current limit based on one or more of   │
│ the coupling with the power source, the power state of the system   │
│ or the one or more voltage parameters                               │
│                            620                                      │
└─────────────────────────────────────────────────────────────────────┘
```

Fig. 6

AVOIDING DAMAGE TO UNIVERSAL SERIAL BUS SINK SWITCH DEVICE

PRIORITY CLAIM

This application claims priority to Indian provisional patent app. no. 202241032744, filed Jun. 8, 2022, titled "Resolving Universal Serial Bus Type C (USB-C) Field Effect Transistor (FET) Damage Due To Psinkstandby Requirement," and incorporated herein by reference.

FIELD

The present application generally relates to the field of electronic circuits and, more specifically, to preventing damage to a field effect transistor (FET) and related integrated power switches due to a power limit which is imposed according to the Universal Serial Bus (USB) standard.

BACKGROUND

Universal Serial Bus (USB) is an industry standard that specifies the physical interfaces and protocols for connecting, data transferring and powering of computing devices such as personal computers (PCs), laptop computers, mobile devices, peripherals and hubs. Many versions of the USB specification have been developed. For example, USB-C is a 24-pin USB connector system with a rotationally symmetrical connector for transmitting both data and power on a single cable. Additionally, a USB Power Delivery (PD) specification defines a Standard Power Range (SPR) which can deliver up to 100 W of power and an Extended Power Range (EPR) which can deliver from 100 to 240 W of power. In some cases, a USB computing device acts as a power sink when it receives power from another device. However, care must be taken to avoid damaging components inside the computing device when power is transferred.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 5 depicts example plots in a power delivery scenario, where a battery of a power-sinking device is in a low charge state and the device is in the S5/S3 state when a charger is plugged in, in accordance with various embodiments.

FIG. 6 depicts an example flow chart of a process for avoiding damage to a FET in a power-sinking device when a power source is attached, in accordance with various embodiments.

DETAILED DESCRIPTION

Figure 1A:
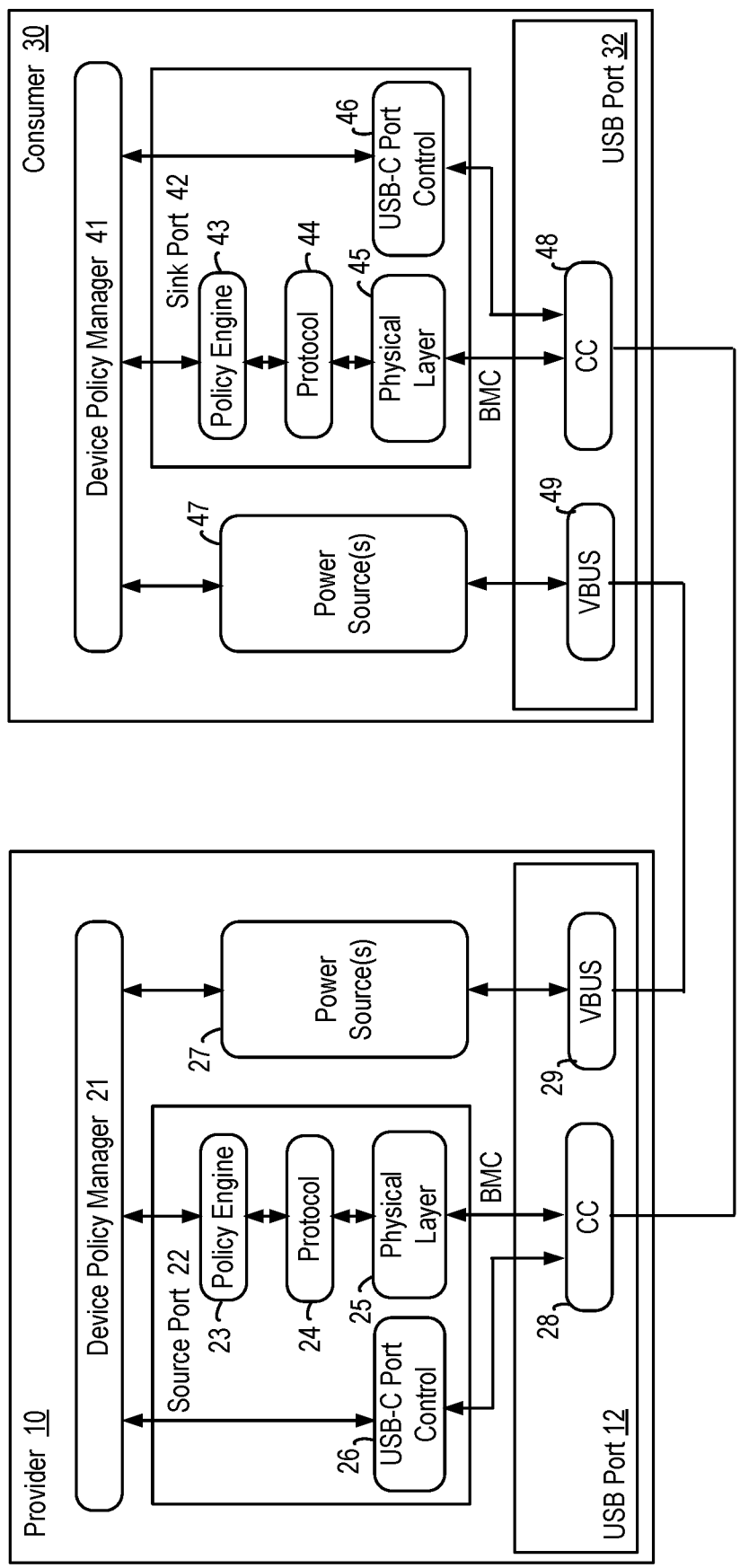
FIG. 1A illustrates a high-level architecture of a provider device 10 and a consumer device 30 as defined by the USB Power Delivery (PD) 3.0 specification.

As previously noted, care must be taken to avoid damaging components inside a computing device when power is transferred. For example, in the legacy USB-C specification, when a power source such as a charger is inserted into a power-sinking device such as a laptop or other mobile device, a negotiation is performed between the two devices to decide on the level of voltage and current that will be provided. Additionally, there is requirement for the power-sinking device to not load power from the power source until the negotiation is finished. In one approach, the USB Power Delivery (PD) specification describes the format of data that will be sent between the source and sink devices during a power negotiation. The specification includes a Standard Power Range (SPR) (a first power range) that supports up to 100 W of power and an Extended Power Range (EPR) (a second power range which is greater than the first power range) which supports between 100 and 240 W of power.

During initial negotiations, only a few milliamps (mA) of current may be allowed, which may be sufficient to power a PD manager circuit in the power-sinking device to start the negotiations. The power may be provided via a FET (e.g., a sink FET or power FET) in the power-sinking device. To achieve this, it may be desirable to keep the FET off until the negotiation is finished and the power-sinking device receives a PS_RDY message from the power source, indicating that the power supply is ready. Specifically, the PS_RDY message is sent by the source to indicate its power supply has reached the desired/negotiated operating condition.

The legacy USB-C specification may also require adherence to a power limit (psinkstandby) when the voltage is ramping up or down across the FET, e.g., 2.5 watt/VBUS. VBUS is a voltage on a power bus or wire which carries a voltage for powering components in a device. If VBUS=20 V, for example, this translates to 125 mA of current. To adhere to the power limit, this can involve, during a voltage transition on the USB-C VBUS, cutting off the load of the system by disabling the sink FET. In a scenario where the system is in the S0 state (a fully awake state), an embedded controller (EC) or the PD manager can disable the sink FET, causing the system to be powered in battery mode.

Once the PD manager negotiates a target voltage and current, the power source ramps up VBUS and sends the PS_RDY message, indicating the power-sinking device can now draw the negotiated current. The PD manager on the power-sinking device informs the EC about the newly negotiated voltage and current. Next, the EC enables the sink FET, which puts the system load on to the USB-C power source.

However, in some situations, the power-sinking device may demand a high current as it switches from battery power to the power from the power source (e.g., a USB-C charger). Moreover, due to the existence of an inrush current limit circuit, the sink FET, which may be a metal-oxide-semiconductor field-effect transistor (MOSFET), may not be fully enhanced, leading to high drain-to-source resistance (RDSon). A MOSFET is fully enhanced when the gate voltage is high enough to create a conductive channel between the source and drain regions. For an n-channel MOSFET, the gate voltage must be higher than the threshold voltage (Vt) to create the conductive channel. With this high RDSon and a current of 5 A, for example, the power may go as high 30-50 W dissipated across the FET. This can burn the FET or cause a thermal trip inside the FET.

One potential solution is to use a large transistor for the sink FET that can handle a high current when it is not fully enhanced. However, this increases costs and space requirements. Another potential solution is to use a power-good signal to indicate when the MOSFET is fully enhanced and therefore supplying stable power. However, this requires an additional general-purpose input/output (GPIO) pin, and complex circuitry to assert power-good to support the multiple voltage levels of USB-C, e.g., 5V, 9V 15V or 20V, as well as other USB specifications including Extended Power Range (EPR) and Programmable Power Supply (PPS). Another potential solution involves controlling inrush current via a soft start. This results in a slow voltage ramp and hence a smaller dV/dt on the charger to meet the inrush current requirement. This can work during cold starts to address inrush current demand by capacitors in a Peripheral Component Interconnect Express (PCIe) endpoint card. However, this will not work when the system is in S0, where a user adds the adaptor/charger.

The solutions described herein address the above and other issues. The solutions may relate to hardware and software that are co-designed to understand the system states such as S0, dead battery, low battery, etc. in a power-sinking device and to manage the timing requirement of a sink FET to fully turn on, while adhering to the inrush current limit of the system. In one aspect, a reduced current limit is imposed on the sink FET for a specified period of time after a power source is connected. After the period of time has passed, the current limit is increased. The reduced current limit can be programmed by into a battery charger which is coupled to the FET, in one approach. The system can also consider its power state at the time the power source is plugged in, such as whether it is fully awake or in a sleep or low/dead battery state.

The solutions provide a number of advantages. For example, it can be implemented without a hardware change, including in existing deployments which follow the USB-C specifications. In one approach, the solution is implemented using a software algorithm in EC firmware. The EC can send a signal to the battery charger to set a current limit. Moreover, the cost of the solutions is much lower compared to designs which increase, e.g., double, the size of the sink FET. Additionally, the solutions may be implemented without the use of an additional GPIO pin.

The above and other advantages will be further apparent in view of the following.

FIG. 1A illustrates a high-level architecture of a provider device 10 and a consumer device 30 as defined by the USB Power Delivery (PD) 3.0 specification. The provider device includes a device policy manager 21, a source port 22, power source(s) 27 and a USB port 12. The source port includes a policy engine 23, protocol 24, physical layer 25 and USB-C port control 26. The USB port includes a CC line 28 line and a VBUS line 29. The device policy manager is in communication with the USB-C port control, the policy engine and the power source(s). The CC line is in communication with the USB-C port control and the physical layer. BMC denotes biphase mark coding. The VBUS line is in communication with the power source(s).

Similarly, the consumer device includes a device policy manager 41, a sink port 42, power source(s) 47 and a USB port 32. The source port includes a policy engine 43, protocol 44, physical layer 45 and USB-C port control 46. The USB port includes a CC line 48 line and a VBUS line 49. The VBUS lines 29 and 49 are coupled and the CC lines 28 and 48 are coupled.

Figure 1B:
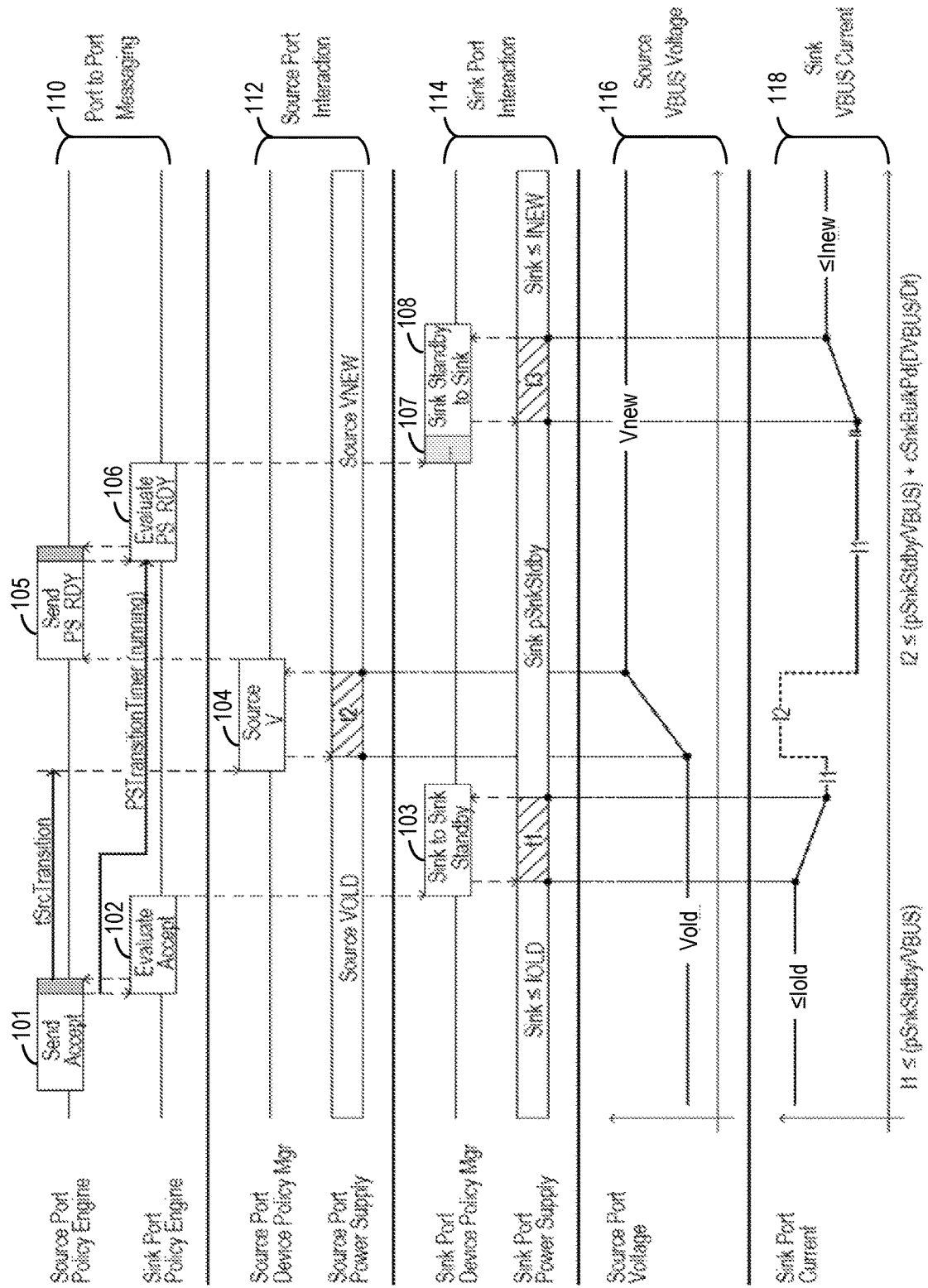
FIG. 1B illustrates an example of a power delivery transition diagram as defined by the USB Power Delivery (PD) 3.0 specification, consistent with FIG. 1A.

FIG. 1B illustrates an example of a power delivery transition diagram as defined by the USB PD 3.0 specification, consistent with FIG. 1A. In the system, the default charger current is configured to the maximum of 1.5 A (an implicit power contract minimum value). An implicit power contract may define default conditions with which a device is preconfigured. In contrast, an explicit power contract can be reached between a power-sinking device and a power source device as a result of a power delivery negotiation process.

An EC, as a system management controller, is aware of the system state denoted by Sx (e.g., S5/4/3/0) and the USB-C charger connection/disconnection state. Computing devices can be in a selected power state among a range of available power states. For example, in the state S0, the computing device is fully operational and awake, and no internal hardware components are in a low power state. Sleep States S1 to S3 refer to increasing levels of computer sleep. Volatile memory, such as RAM, is kept refreshed to allow the system to retain the state it was in when it entered sleep. S4 refers to a hibernate mode and S5 refers to a soft off mode.

By enhancing the EC firmware to know the input and output voltage ramp up time of the sink FET, an active policy in the EC can be implemented which can fine tune the charger input-limit current based on the state of the system and the sink FET input and output voltage levels. In one possible approach, the current limit is set by programming a battery charger that is coupled to the FET. By limiting the current through the battery charger, which is in series with the FET, the current through the FET is limited. The active policy can involve determining whether the output voltage meets the negotiated voltage or is still below the negotiated voltage. Once the output voltage of the sink FET meets the negotiated input voltage, the EC can increase the current limit to the current limit of a Power Data Object (PDO) that was negotiated with the source port partner, such as a USB-C adapter/charger.

A PDO is a structured data object that contains information about a power source's capabilities and provides negotiation information to a USB PD device. A PDO includes information such as the maximum voltage and current that a power source can supply, along with other characteristics such as the power source's type, capabilities, and status. A USB PD device can request a PDO from a power source and then negotiate a power contract based on the information in the PDO.

There are two types of PDOs: Source PDOs and Sink PDOs. A Source PDO describes the power that a power source can provide, while a Sink PDO describes the power that a USB PD device can accept. When a USB PD device is connected to a power source, it sends a Request message to the source, which responds with a list of available Source PDOs. The device then selects a Sink PDO from the list and sends a message to the power source to negotiate the power contract.

The power delivery transition diagram include plots 110 associated with port-to-port messaging (source and sink port policy engines), plots 112 associated with source port interaction (source port device policy manager and source port power supply), plots 114 associated with sink port interaction (sink port device policy manager and sink port power supply), plots 116 associated with source Vbus voltage (source port voltage) and plots 118 associated with sink Vbus current (sink port current).

At block 101, at the source port, the Policy Engine sends the Accept Message to the Sink and, at the sink port, the Policy Engine evaluates the Accept Message and starts the PSTransitionTimer. The PSTransitionTimer is used by the Policy Engine to timeout on a PS_RDY Message. An accept message is sent by the source to signal the sink that the source is willing to meet a request message.

A Request Message is sent by a sink to request power, typically during the request phase of a power negotiation. The request data object is returned by the sink which is making a request for power. It is sent in response to the most recent source_capabilities message. A request message returns a sink request data object that identifies the power data object being requested and the requested power level.

At block 102, at the source port, the Protocol Layer receives the GoodCRC Message from the Sink. The Policy Engine tells the Device Policy Manager to instruct the power supply to modify its output power and, at the sink port, the Protocol Layer sends the GoodCRC Message to the Source. Policy Engine then evaluates the Accept Message.

At block 103, at the sink port, the Policy Engine tells the Device Policy Manager to instruct the power supply to reduce power consumption to pSnkStdby within tSnkStdby (t1); t1 shall complete before tSrcTransition. pSnkStdby is a maximum allowed power consumption while in Sink Standby (e.g., 2.5 W). The Sink shall not violate a new load current overshoot, iOvershoot, while transitioning to and operating at the new power level. tSrcTransition is the time the Source Shall wait before transitioning the power supply to ensure that the Sink has sufficient time to prepare. The minimum and maximum values of the time are 25 and 35 µs, respectively.

At block 104, at the source port, the tSrcTransition after the GoodCRC Message was received the power supply starts to change its output power capability. The power supply shall be ready to operate at the new power level within tSrcReady (t2). The power supply informs the Device Policy Manager that it is ready to operate at the new power level. The power supply status is passed to the Policy Engine.

At block 105, at the source port, the Policy Engine sends the PS_RDY Message to the Sink and at the sink port, the Policy Engine receives the PS_RDY Message from the Source.

At block 106, at the source port, the protocol Layer receives the GoodCRC Message from the Sink and, at the sink port, the Protocol Layer sends the GoodCRC Message to the Source. Policy Engine then evaluates the PS_RDY Message from the Source and tells the Device Policy Manager it is okay to operate at the new power level.

At block 107, at the sink port, the Sink may begin operating at the new power level any time after evaluation of the PS_RDY Message. This time duration is indeterminate.

At block 108, at the sink port, the Sink shall not violate iOvershoot while transitioning to and operating at the new power level. The time duration (t3) depends on the magnitude of the load change.

cSnkBulkPd is the bulk capacitance on VBUS. The minimum and maximum values of the capacitance are 1 and 100 µF, respectively.

Figure 2:
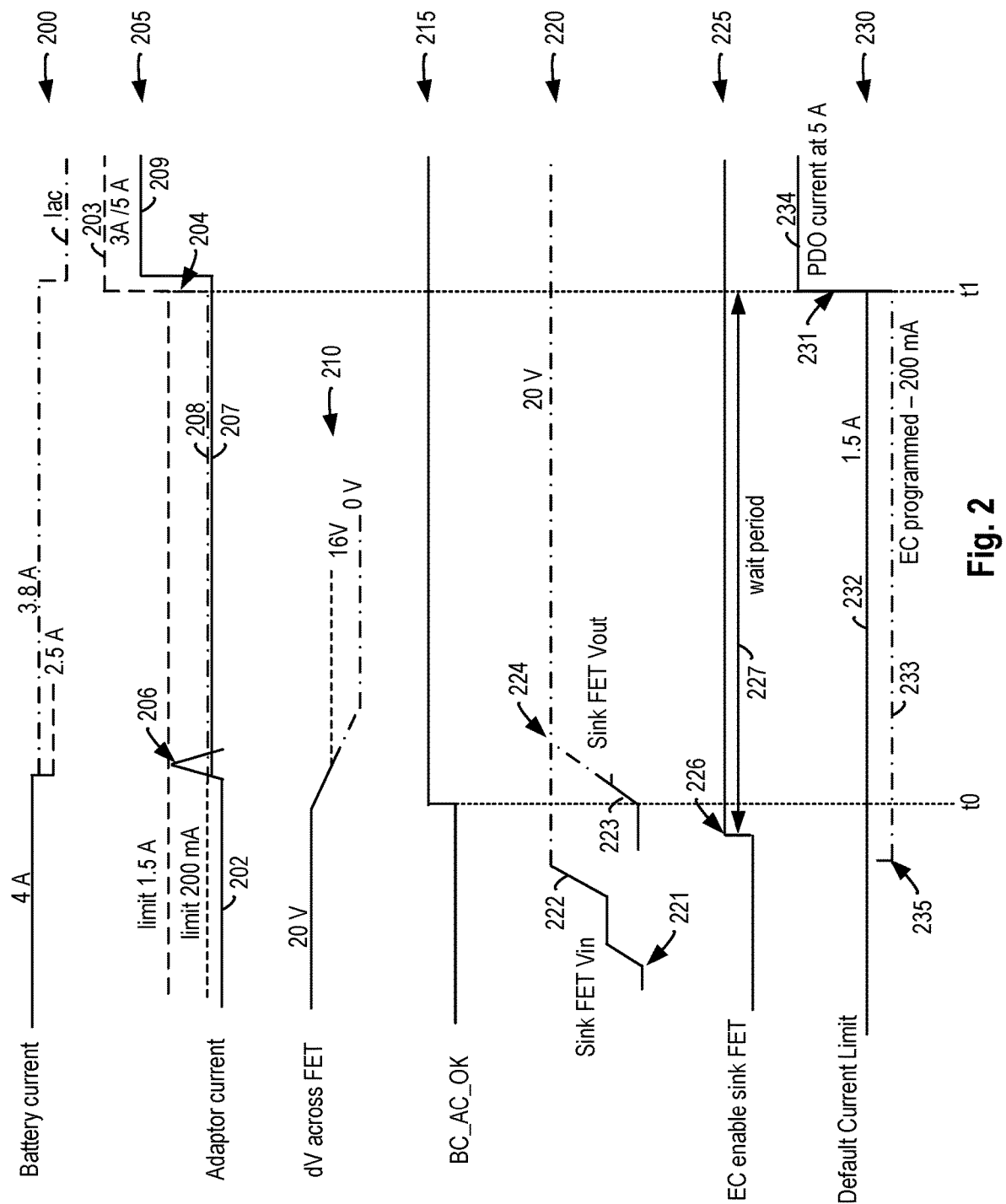
FIG. 2 depicts example plots in a power delivery scenario, where a battery of a power-sinking device is charged and the device is in the S0 state when a charger is plugged in, in accordance with various embodiments.

FIG. 2 depicts example plots in a power delivery scenario, where a battery of a power-sinking device is charged and the device is in the S0 state when a charger is plugged in, in accordance with various embodiments. In this case, a USB-C charger is plugged into a computing device having two serial-connected batteries (2S), where the computing device is in the S0 state. The battery voltage may be constant in S0 at greater than 8V. The figure shows a failure scenario and a success scenario. The dash-dot lines are associated with the success scenario. A time t0 represents when a signal BC_AC_OK goes high, indicating that the battery is connected to the VBUS and is allowed to discharge to power the circuits of the power-sinking device. A time t1 represents when the current limit is increased from a reduced level to its maximum level.

The plots 200 depict a battery current due to system load, and includes an initial current of 4 A, when the FET is off. The battery mode discharge current is 2.5 A in the failure scenario and 3.8 A in the success scenario. After t1, a reduced, AC mode charging current (Iac) is used in the success scenario. This refers to current provided by an AC-powered wall charger or other source device, for example.

The plots 205 depict an adaptor current, e.g., the default EC charger current. This is the current provided by the source device. The adaptor current is initially at zero when the FET is off (plot 202). After the FET is enabled at point 226, some time will pass before the FET passes current. Once the FET begins passing current, the current level will increase quickly when the current limit is the relatively high level of 1.5 A. In this case, at a point 206, the FET/load switch goes to thermal trip due to a high current ramp up, reaching the limit of 1.5 A in the failure scenario.

A lower limit of 200 mA (plot 208), or a first current limit, is also depicted in a success scenario. In this case, the current increases to only 200 mA (plot 207) and remains at this level until the current limit subsequently increases to 3 A or 5 A, a second current limit, for example (plot 203) at t1 (at point 204), respectively. The current may increase to a level represented by the plot 209 which is less than the limit of plot 203. The current may increase to a level which is as high as the limit of plot 203. The sink FET thus supports a higher current at this time.

The 200 mA limit is an example only. An example range is from 0 to 1.5 A, where 0<MinChargerInlimit<1.5 A. MinChargerInlimit is the minimum charger input current limit.

Plots 210 depict a voltage across the sink FET, e.g., a difference dV between the input and output voltages at the source/drain terminals, e.g., dV=Vin−Vout. dV is initially at 20 V and then decreases as the FET output voltage begins to increase. In the failure option, dV decreases to 16 V when the thermal trip occurs. In the success option, dV decreases to 0 V, indicating the FET is fully turned on.

Plot 215 depicts BC_AC_OK, which goes high at t0, as mentioned above. In particular, BC_AC_OK goes high once the SINK FET output reaches a certain threshold to indicate the adapter/power source voltage is present at the battery charger input.

Plots 220 depicts the input and output voltages, Vin and Vout, respectively, of the sink FET. The point 221 is when the type-C adapter is plugged in to the power-sinking device so that Vin starts to increase. Vin increases in two steps to its peak value, e.g., 20 V at plot 222. Plot 223 indicates that Vout increases some time later, eventually also increasing to 20 V. In particular, the time point 224 indicates that Vout has ramped up to the full voltage of 20 V, equal to Vin, within the allowed wait period 227 (or delay) of, e.g., 50 ms or greater. Vout and Vin are also referred to as the system-side and VBUS-side voltages, respectively, of the sink FET. The 50 ms wait period is an example only and can vary depending on factors such as the type and size of MOSFET. The waiting period could vary from 5-500 ms, for example.

Plot 225 depicts the sink FET enable signal from the EC. It goes high at a point 226, where a timer is started to measure the wait period 227, which ends at t1, after which the current limit of the FET can increase.

Plot 230 depicts a default current limit, e.g., the maximum current configured by the system to the load charger. In the failure scenario, at plot 232, the current limit is fixed at the higher level of 1.5 A, and subsequently increases at t1 (at time point 231) to a higher level such as the PDO current (a negotiated current limit) at 5 A (plot 234). The EC can program/write the higher current limit to the battery charger, for example. In the success scenario, at plot 233, the current limit is reduced to 200 mA, for example, such as based on a programmed level at the EC. The reduced level is set (point 235) before the sink FET is enabled (point 226). After the wait period 227 expires at t1, the current limit is increased from 200 mA to 5 A, for example. Thus, in the failure scenario, the EC writes the 1.5 A default adapter current limit to the battery charger (BC). See also FIG. 13. In the success scenario, the EC writes the reduced 200 mA adapter current limit to the BC.

The reduction of the current limit to 200 mA is an example only. Generally, the reduced current limit during the wait period will be significantly less than the negotiated current limit with the power source, e.g., less than 20-50% of the negotiated current limit.

In sum, the power-sinking device is in S0 and drawing power from VDD. When the USB-C charger is plugged in, to meet the pSnkStdby limitation, the device is required to keep the load off until VBUS reaches its max voltage.

Once VBUS is stabilized, the EC enables the sink FET to connect the charger to the system load. At this moment, due to system load, the FET current increases suddenly before the output (Vout) of the sink FET ramps up to the input voltage (Vin), leading to a high voltage difference (dV) with a high current. This may lead to an undesirably large power dissipation across the FET, and the repetition of such an instance may lead to burning (failure) of the sink FET.

Instead, by reducing the current limit temporarily, the above-mentioned disadvantages can be avoided.

Figure 3A:
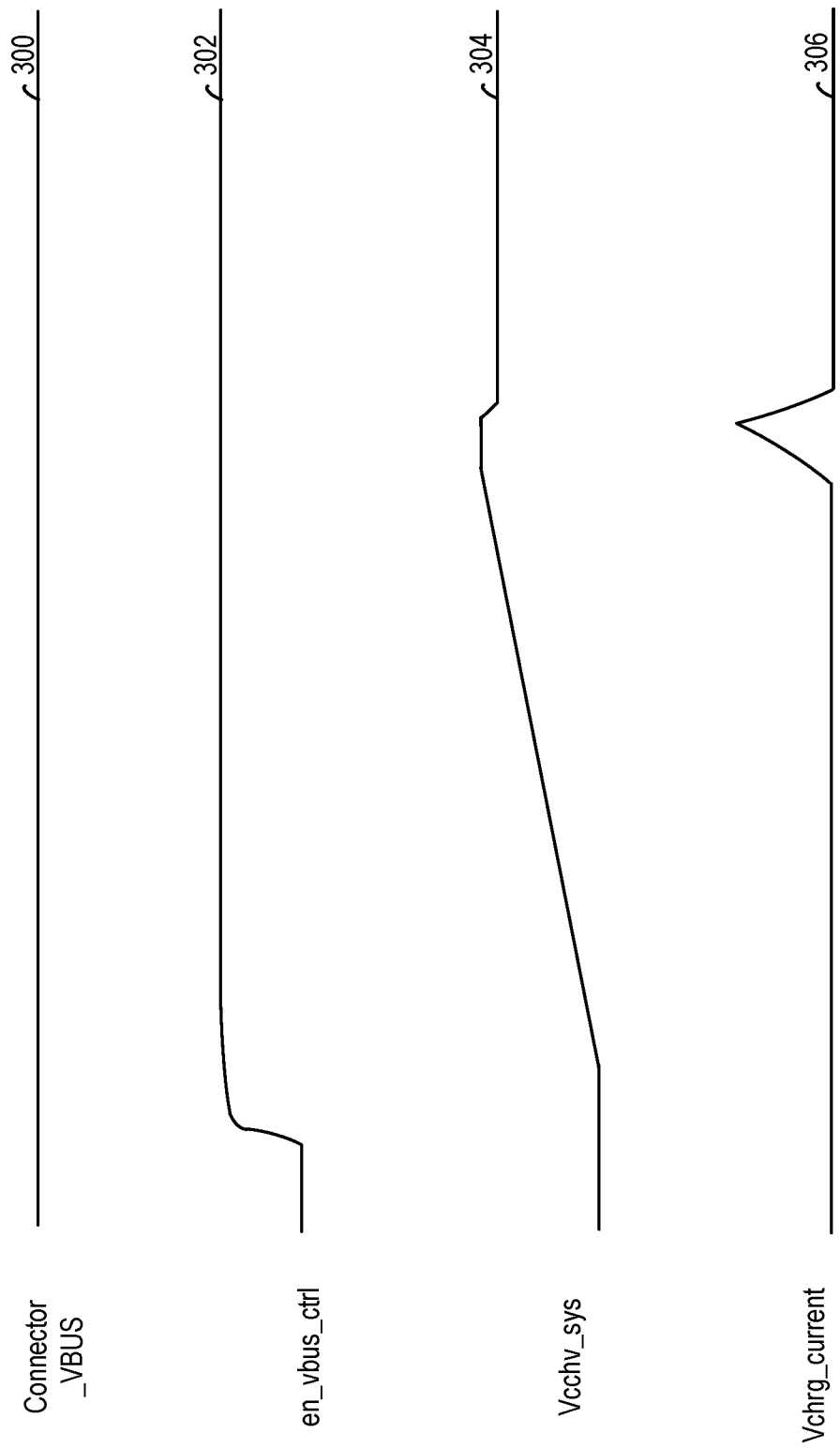
FIG. 3A depicts example plots in a failure scenario when a system is powered with a battery (2S) and is in the S0 state when a charger is plugged in, consistent with FIG. 2, in accordance with various embodiments.

FIG. 3A depicts example plots in a failure scenario when a system is powered with a battery (2S) and is in the S0 state when a charger is plugged in, consistent with FIG. 2, in accordance with various embodiments. A plot 300 depicts Connector_VBUS, the connector-side bus voltage on the VBUS, which is constant. Connector-side refers to the side facing the external USB connector/power source. A plot 302 depicts en_vbus_ctrl, which increases when the VBUS is enabled. It is a control signal that turns the sink FET on and off. The plot 304 depicts Vcchv_sys, which increases from an initial level to a higher level. This is the system-side voltage, after the sink FET. System-side refers to the side facing the load of the power-sinking device. The plot 306 depict Vchrg_current, which is the current flowing through the FET to the system. There is a large inrush current peak during the vcchv_sys failure. The signals/voltages can be mapped to the circuit depicted in FIG. 3B.

The failure scenario of FIG. 2 is captured by the plot 304, which is the voltage ramp after the sink FET, and the plot 310, indicating a current increase across the sink FET resulting in an undesirably large power dissipation across the FET which may damage the FET, as discussed.

Figure 3B:
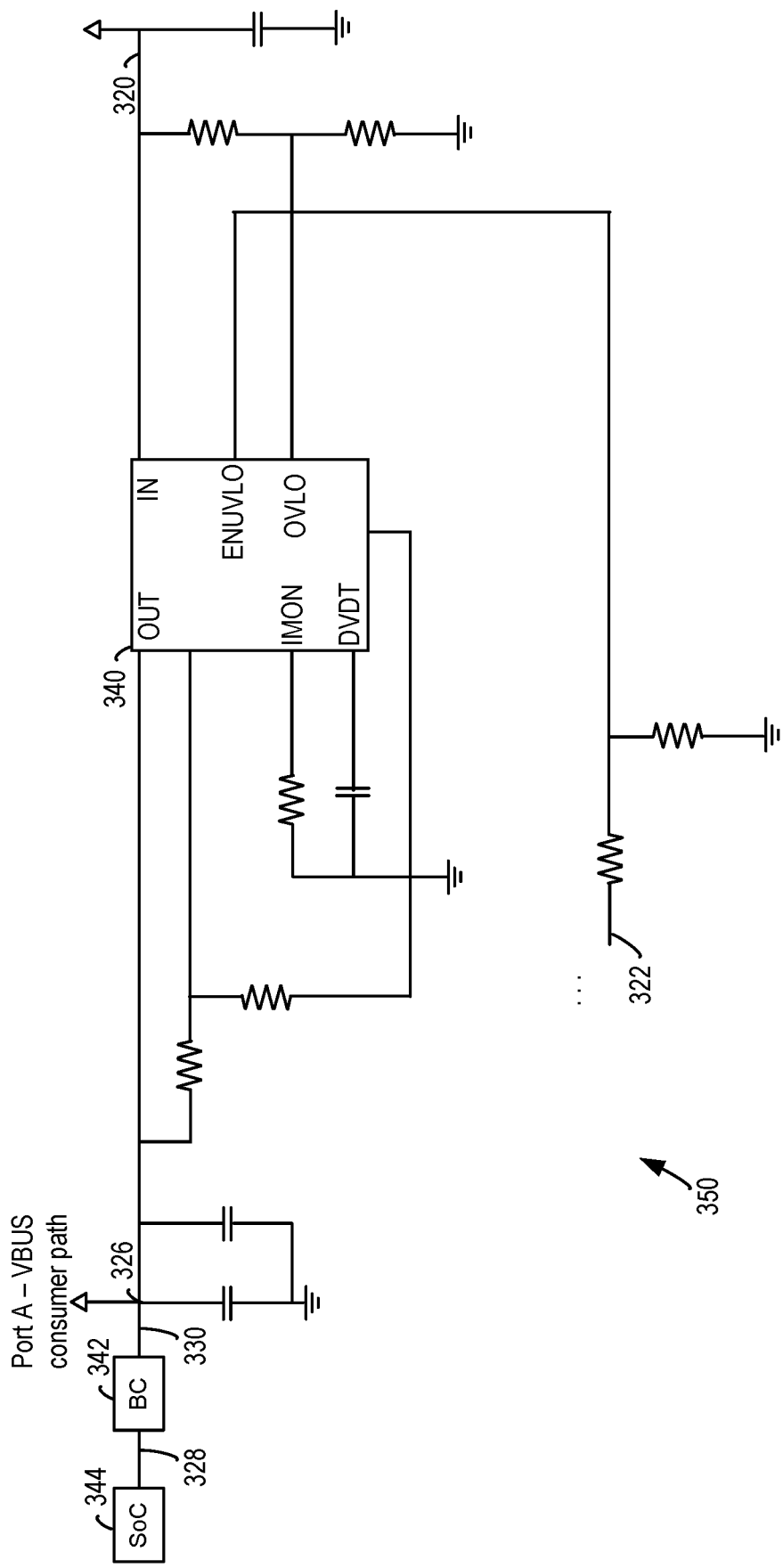
FIG. 3B depicts an example circuit corresponding to the plots of FIG. 3A, in accordance with various embodiments.

FIG. 3B depicts an example circuit corresponding to the plots of FIG. 3A, in accordance with various embodiments. The circuit 350 includes a load switch (also called a power switch or an integrated FET device) 340, similar to a FET-based circuit which integrates the FET with a control circuit. An example implementation of the device is the LM73100, Integrated Ideal Diode with Input Reverse Polarity and Overvoltage Protection, available from Texas Instruments™. In this device, EN/UVLO is an active high enable, OVLO is a resistor divider, IN is a power input, OUT is a power output, DVDT sets the output turn on slew rate, GND is a ground reference, and IMON is an analog load current monitor.

The circuit 350 further includes a battery charger (BC) 342 and a system-on-a-chip (SoC) 344. The SoC is an example load that is powered by the BC 342 in some cases but any type of chip or circuit can be used. The integrated FET device has a number of inputs/outputs including OUT, PGTH, PG (power-good), IMON, DVDT, IN, ENUVLO, OVLO and DNC. The plot 300 in FIG. 3A represents a voltage at the point 320. The plot 302 represents a voltage at the point 322. The plot 304 represents a voltage at the point 326. The plot 306 represents a voltage at the point 328, between the BC and SoC. The plot 310 represents a voltage at the point 330, before the BC.

Figure 3C:
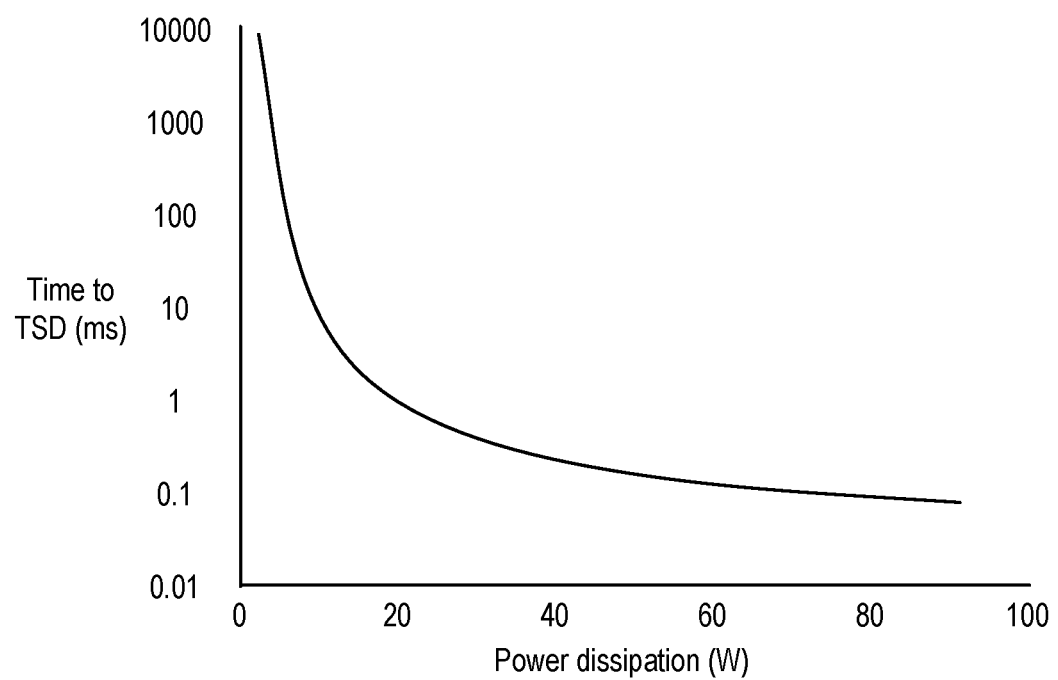
FIG. 3C depicts an example plot of time to thermal shutdown (TSD) versus power dissipation for integrated power switching devices of a field-effect transistor (FET), in accordance with various embodiments.

FIG. 3C depicts an example plot of time to thermal shutdown (TSD) versus power dissipation for integrated power switching devices of a field-effect transistor (FET), such as the device 340, in accordance with various embodiments. The time to TSD, representing when the output current of a transistor is cut off due to an increasing temperature, is during an inrush state. It can be seen that the time to TSD decreases sharply as the power dissipation increases. The techniques provided herein advantageously avoid the thermal shutdown condition.

Figure 4:
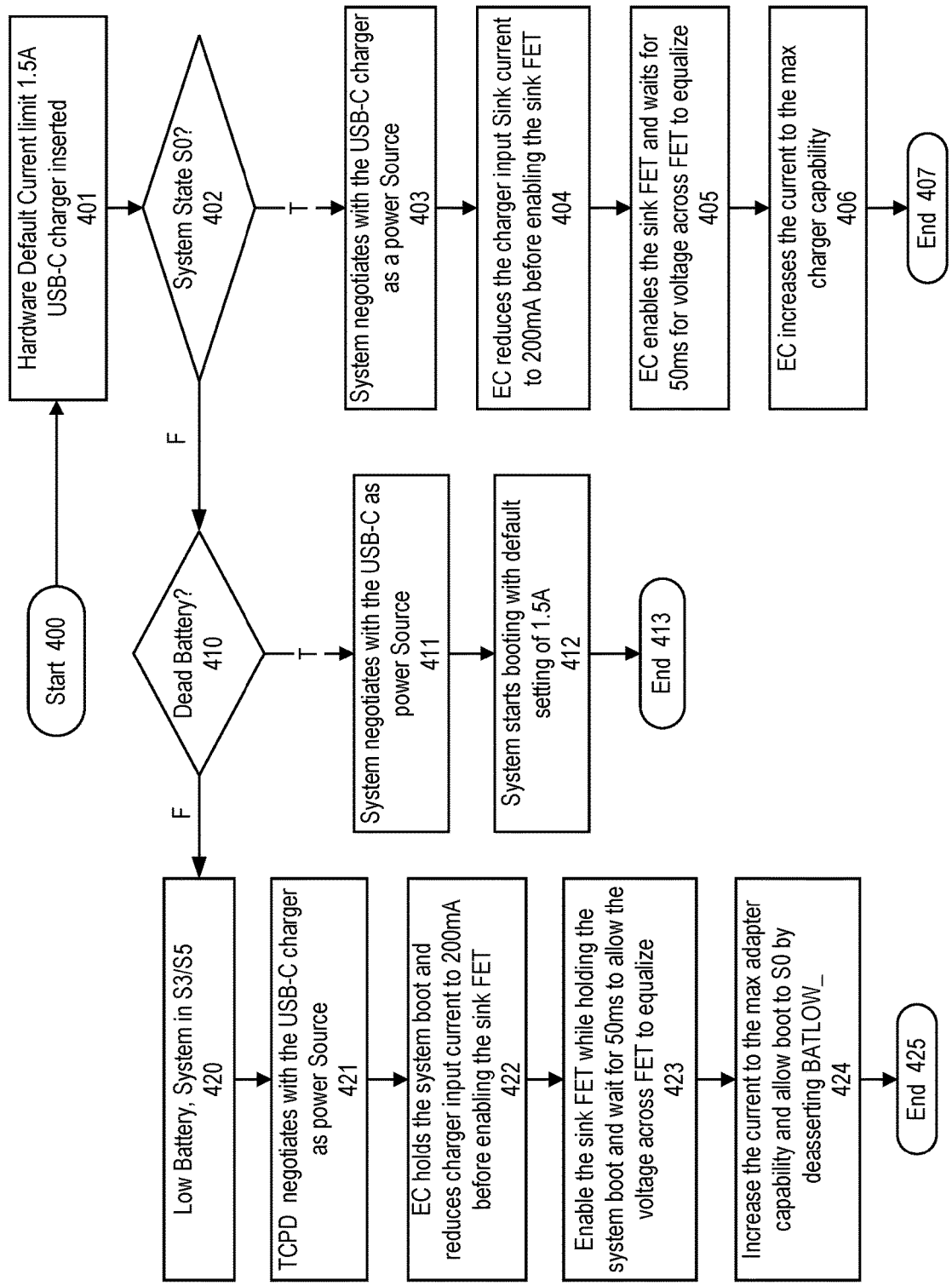
FIG. 4 depicts an example flow chart/state diagram of a process for use at a power-sinking device, in accordance with various embodiments.

FIG. 4 depicts an example flow chart/state diagram of a process for use at a power-sinking device, in accordance with various embodiments. Generally, based on the system state, e.g., S0, dead battery or low battery, the current and hence the power load for the charger may be controlled for an initial period (such as 50 ms) after the charger is plugged into the power-sinking device to allow the input and output voltage of the sink FET to equalize, e.g., within a tolerance such as 5-10%. Subsequently, the current may be increased to the PDO current.

The process starts at a block 400. At a block 401, a hardware default current limit is set to 1.5 A, for example, when a USB-C charger (adapter) is inserted into a USB port of the power-sinking device. A decision block 402 determines whether the system (the power-sinking device) is in the S0 state. If the decision block 402 is true, a block 403 is reached where the system negotiates with the USB-C charger as a power Source. At block 404, the EC reduces the charger input Sink current to 200 mA, for example, before enabling the sink FET. This can involve, e.g., programming the current limit in the battery charger. Block 405 involves the EC enabling the sink FET and starting a wait period of at least 50 ms, for example, to allow the voltage across the FET to equalize. This involves waiting for Vout to ramp up, as discussed in connection with FIG. 2. Block 406 involves the EC increasing the current to the maximum charger capability, e.g., 3-5 A. This can involve programming the current limit in the battery charger. The process ends at block 407.

In sum, when the USB-C adapter is plugged into the device in the S0 state, the following steps can be performed. First, in S0 when system is powered by the battery, once the USB-C adapter is plugged in and the PD manager negotiates a higher power with the adapter as a source, the source voltage ramps up to the negotiated voltage. Second, before enabling the sink FET, the EC ensures the charger input sink current is reduced to a very low level, e.g., 200 mA. Third, the EC enables the sink FET and waits for 50 ms to ramp up the FET output voltage. Fourth, when the FET input and output voltage are at the same level, as can be assumed at the end of the wait period, the EC programs the charger input current limit as per the negotiated PDO level.

If the decision block 402 is false (F), a decision block 410 determines whether the power-sinking device has a dead battery. This can be based on the EC obtaining a charge level reading of the battery and determining that the charge level is below a threshold, e.g., less than 5-10% of the fully charged state. One approach to measuring charge level or capacity involves a fuel gauge. In one approach, the fuel gauge can determine the charge based on the battery voltage and a charge flow, which can be determined using coulomb counting. Coulomb counting can involve integrating the currents flowing into and out of the battery cell. A small resistor can be connected in series with the anode of the battery to measure these currents with a high-resolution analog-to-digital converter (ADC). In one approach, the EC communicates with the fuel gauge via an Inter-Integrated Circuit (I2C) bus. If the decision block 410 is true (T), a block 411 is reached where the system negotiates with the USB-C charger as the power Source. At block 412, the system starts booting (to the S0 state) with a default setting of 1.5 A as the current limit. The process ends at block 413.

In sum, when the USB-C adapter is connected to a system with a dead battery (also referred to as the G3 state), the following steps can be performed. First, in the G3 state, with a dead battery (or no battery), the USB Type-C PD manager (TCPD) will enable the sink FET upon connection of the USB-C adapter/charger. Second, as the system is not yet booted to S0 and has a relatively small system load, the FET has enough time for voltage ramp up before the EC powers up to allow the system to enter the S0 state. Third, the EC powers up and reads the negotiated PDO current and programs the charger input current limit. Fourth, the system boots to the S0 state.

If the decision block 410 is false, block 420 indicates there is a low battery and the system is in the S3 (sleep state) or S5 state (shutdown or off state). These states are reduced power states which are lower-powered than the fully awake state. At block 421, the TCPD negotiates with the USB-C charger as the power Source. At block 422, the System (EC) holds (delays) the boot (e.g., by asserting BATLOW_, a low battery signal) and reduces the charger input sink current to 200 mA, for example, before enabling the sink FET. The delay of the boot process allows the batteries to get charged so that a smooth boot process is provided and the state toggling such as at the point 541 in FIG. 5 is avoided.

Block 423 includes enabling the sink FET while holding the system boot and waiting for 50 ms, for example, to allow the voltage across the FET to equalize. Block 424 includes increasing the current to the maximum adapter capability and allowing the system to boot to S0 by deasserting BATLOW_. The process ends at block 425.

In sum, when the USB-C adapter is connected to a system in the S5/3 state with a low battery, the following steps can be performed. First, in the S5/3 state with a low battery (battery capacity is less than, e.g., 10% of the fully charged capacity), the EC will assert BATLOW_ to hold (delay) the system boot to S0. Second, upon the connection of the USB-C adapter, the EC ensures the charger input sink current is reduced to very low level. Third, the EC enables the sink FET and waits for 50 ms to allow a ramp up of the FET output voltage. Fourth, when the input and output voltage of the FET are at same level, the EC programs the charger input current limit as per the negotiated PDO level. Fifth, the EC deasserts BATLOW_ to allow the system to boot to the S0 state.

Note that the current limits and time periods discussed are examples only, as other values can be used.

FIG. 5 depicts example plots in a power delivery scenario, where a battery of a power-sinking device is in a low charge state and the device is in the S5/S3 state when a charger is plugged in, in accordance with various embodiments. In this scenario, there is a G3 boot, and the device is in the S5 state due to the low battery. Additionally, the default EC charger current limit is 1.5 A and the battery power is at 6.4 V with the adapter plugged in.

The figure shows a failure scenario and a success scenario. The dash-dot lines are associated with the success scenario. A time t0 represents when BC_AC_OK goes high, indicating the adapter is present. A time t1 represents when the current limit is increased from a reduced level to its maximum level.

The plot 500 depicts a battery current due to system load, and includes an initial current of 500 mA, when the FET is off. The battery discharge current then reduces to 0 A after t0 and −2 A after t1. The negative current indicates the battery is charging and current is flowing into the battery.

The plots 505 depict an adaptor current, which is initially at zero when the FET is off (plot 502). At a point 506, the FET goes to thermal trip due to a high current ramping up, reaching a limit of 1.5 A (plot 507) in the failure scenario. A lower limit of 200 mA (plot 508) is also depicted in a success scenario. The current limit may subsequently increase to 5 A after t1 (plot 503). In the success scenario, the current remains at 200 mA (plot 509) before increasing gradually (plot 504) toward the raised limit at t1. The current may increase to a level which is less than, or as high as, the limit of plot 503.

Plots 510 depict a voltage across the sink FET. dV is initially at 20 V and then decreases as Vout begins to increase. In the failure option, dV decreases to 16 V when the thermal trip occurs. In the success option, dV decreases to 0 V, indicating the FET is fully turned on.

Plot 515 depicts BC_AC_OK, which goes high at t0, as mentioned above.

Plots 520 depicts the input and output voltages, Vin and Vout, respectively, of the sink FET. The point 521 is when the USB-C adapter is plugged in to the power-sinking device so that Vin starts to increase. Vin increases in two steps to its peak value, e.g., 20 V (plot 522). Plot 523 indicates that Vout increases some time later, eventually also increasing to 20 V. The time point 524 indicates that Vout has ramped up to the full voltage of 20 V, equal to Vin, within the allowed wait period 527.

Plot 525 depicts the sink FET enable signal from the EC. It goes high at a point 526, where a timer is started to measure a wait period 527 which ends at t1, after which the current limit of the FET can increase.

Plot 530 depicts a default current limit. In the failure scenario, at plot 532, the current limit is 1.5 A. The limit subsequently increases at t1 to a higher level such as the PDO current (a negotiated current limit) at 5 A (plot 534). In the success scenario, at plot 533, the current limit is reduced to 200 mA, for example. The reduced level is set (point 531) before the sink FET is enabled (point 526). After the wait period 527 expires at t1, the current limit is increased from 200 mA to 5 A, for example. Thus, in the failure scenario, the EC writes the 1.5 A default adapter current limit to the BC while in the success scenario, the EC writes the reduced, 200 mA adapter current limit to the BC.

Plots 535 depict a battery low (BAT_LOW) signal. In the failure scenario, the signal is asserted after t0 (plot 536). In the success scenario, the signal is not asserted until t1, as indicated by plots 537 and 538. In other words, the boot is held or delayed by keeping BAT_LOW=low until the PDO current is programmed. The system is allowed to boot up from the low battery state to the S0 state at t1. The boot may be held for the same wait period, e.g., at least 50 ms, used to allow the voltages across the FET to equalize, in one approach.

Plot 540 depicts a system state signal. The state is initially at S5/S3 but can toggle to S0 after t0, at point 541, in the failure scenario. The signal then returns to S5/S3 until after t1, when it transitions to S0 (plot 543). In the success scenario, the state remain in S5/S3 (plot 542) until point 544. The system starts to boot to S0 at t1 and completes the boot at point 544. Specifically, when the EC releases BAT_LOW during the 200 mA current limit, at point 539, this results in a limited power availability to the system and can lead to toggling between S5/S3 and S0 one or more times before settling at S0. One toggle is depicted as an example.

FIG. 6 depicts an example flow chart of a process for avoiding damage to a FET in a power-sinking device when a power source is attached, in accordance with various embodiments. This is an example technique related to charger input-limit current identification to resolve USB-C FET damage.

While the blocks are illustrated in a particular sequence, the sequence can be modified. For example, some blocks can be performed before others, and some blocks can be performed simultaneously. In general, the technique may be performed by an EC of the system, while in other embodiments the technique may be performed by additional or alternative elements, processors, logic, etc. For example, the EC may be part of, or related to, one or more of the control hub 1432, the PCU 1410*b*, the PMIC 1412, and the processor 804 as described below with respect to FIG. 14.

The technique may include identifying, at block 605, that a system (e.g., a power-sinking device) has been coupled with a power source by a USB Type-C (USB-C) port of the system; identifying, at block 610 a power state of the system in response to the identification that the system has been coupled with the power source; identifying, at block 615, one or more voltage parameters related to a field effect transistor (FET) communicatively coupled with the USB-C port; and identifying, at block 620 a charger input current limit based on one or more of the coupling with the power source, the power state of the system, or the one or more voltage parameters.

The flowcharts provided herein can be performed partially or wholly by software providing in a machine-readable storage medium (e.g., memory). The software is stored as computer-executable instructions (e.g., instructions to implement any other processes discussed herein). Program software code/instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart (and/or various embodiments) are executed by the processor system.

In some embodiments, the program software code/instructions associated with the flowchart (and/or various embodiments) are stored in a computer executable storage medium and executed by the processor. Here, the computer executable storage medium is a tangible machine readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with the flowchart and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible, non-transitory machine readable medium in entirety at a particular instance of time.

Examples of the tangible, non-transitory computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (e.g., stores and/or transmits in digital form, e.g., data packets) information in a form accessible by a machine (e.g., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 7:
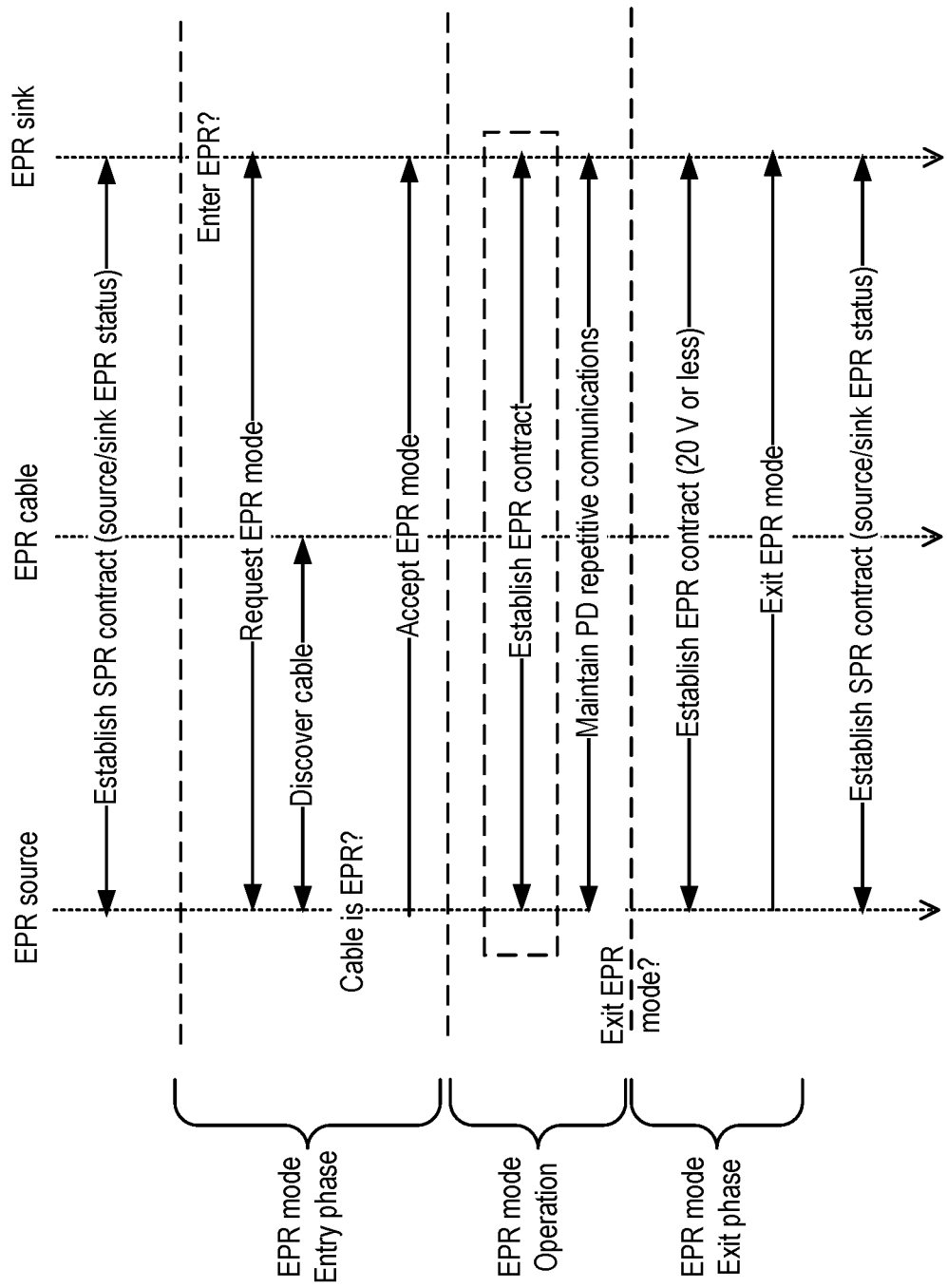
FIG. 7 depicts an Extended Power Range (EPR) mode operational flow as defined by the USB PD 3.1 specification.

FIG. 7 depicts an Extended Power Range (EPR) mode operational flow as defined by the USB PD 3.1 specification. As mentioned, the USB specifications define a Standard Power Range (SPR) which can deliver up to 100 W of power and an Extended Power Range (EPR) which can deliver from 100 to 240 W of power. SPR is based on voltages of 5V, 9V, 15V and 20V with up to 5 A of current for a total of up to 100 W. EPR is based 28V for 100 to <140 W, 36V for 140 to <180 W and 48V above 180 W, with up to 5 A of current.

However, with the USB PD3.1 specification, it is mandatory to enter the SPR mode (i.e., <20V profile) before entering the EPR mode (i.e., >20V). As a result, before the adapter ramps up the VBUS to the EPR voltage, the sink side path should be turned off to meet the pSnkStdby requirement. As before, while turning on the sink path with the new EPR VBUS voltage, the system load will cause the inrush current and lead to a sink FET failure, similar to the issue noted above. The stage at which this failure occurs is: "Establish EPR Contract."

In particular, entry into EPR Mode follows a strict process to ensure that the higher voltages, at power levels above 100 W, are only transferred between known EPR-capable Sources and EPR-capable Sinks over EPR-capable cables. EPR Sources are capable of both Fixed and an Adjustable Voltage Supply (AVS) operation. Maintaining EPR Mode operation also requires maintaining a regular cadence of USB PD communications; loss of communications between the Source and Sink will cause a hard reset to be initiated resulting in a return to SPR operation.

The EPR Mode normal entry, operational and exit process is summarized by the following steps:

1) Negotiate and enter into an Explicit Power Contract in the Standard Power Range. During this step, EPR-capable Sources and Sinks will declare their supported EPR capabilities through PDO/APDO and RDO exchanges.
2) An EPR Sink, having discovered an EPR Source, can request EPR Mode entry.
3) The EPR Source, upon receiving a EPR Mode entry request from the EPR Sink, will re-query the attached cable to verify its EPR capability.
4) The EPR Source, having confirmed the EPR cable, will respond to the EPR Sink with an acknowledgement of the EPR Mode entry request.
5) While in EPR Mode a. The EPR Source sends EPR Capabilities (Fixed PDOs and an AVS Augmented PDO (APDO)) to the EPR Sink which requires the Sink to evaluate and respond as appropriate to adjust the Explicit Power Contract.
b. The EPR Sink maintains a regular cadence of communications with the EPR Source to allow EPR Mode to continue.

6) When either the EPR Source or EPR Sink no longer wants to remain in EPR Mode operation, a normal exit from EPR Mode will first require adjusting the Explicit Power Contract to a Voltage of 20V or lower followed by an explicit EPR Mode exit request.

a. Source initiated: EPR Source sends an EPR capabilities message that only includes SPR Voltages to force the EPR Sink to drop to 20V or below followed by the EPR Mode exit. Once EPR Mode is exited, a new SPR contract is negotiated to formalize the return to SPR mode operation—the Source can remove its EPR-capable declaration to hold off attempts by an EPR Sink to re-enter EPR Mode.
b. Sink initiated; EPR Sink requests a drop to 20V or below followed by the EPR Mode exit. Once EPR Mode is exited, a new SPR contract is negotiated to formalize the return to SPR mode operation.

The example illustrates a normal EPR Mode operational flow. In this example, at some time during the EPR Mode operation, the Source decides that it needs to exit EPR Mode, so it resends the EPR Capabilities to the Sink with only SPR PDOs to cause the Sink to drop to 20V or lower and then the Source follows with an EPR Mode exit message. Once EPR Mode is exited, a new SPR contract is negotiated to formalize the return to SPR mode operation.

Figure 8:
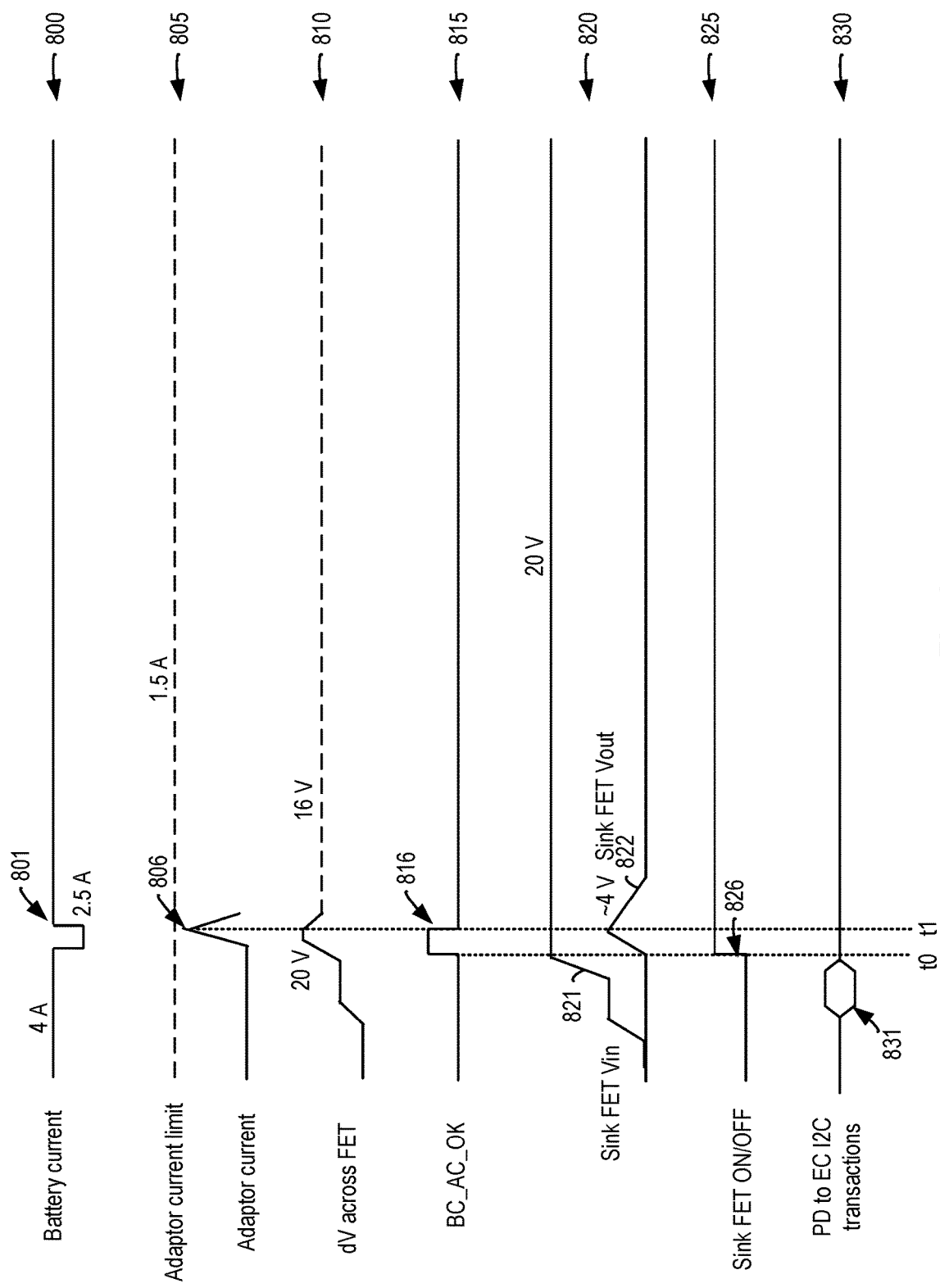
FIG. 8 depicts example plots in a power delivery scenario, where a battery of a power-sinking device is charged and the device is in the S0 state when a charger is plugged in, in a failure scenario, consistent with FIG. 3A, in accordance with various embodiments.

FIG. 8 depicts example plots in a power delivery scenario, where a battery of a power-sinking device is charged and the device is in the S0 state when a charger is plugged in, in a failure scenario, consistent with FIG. 3A, in accordance with various embodiments. In this scenario, the system is powered by two serial-connected batteries, where the battery voltage is greater than 8 V. This is a diagram which depicts the problem of the oscilloscope plot of FIG. 3A in further detail.

A time t0 represents when BC_AC_OK goes high, indicating that the battery is connected to the VBUS, and a time t1 represents when BC_AC_OK goes low, indicating that the battery is disconnected from the VBUS.

The plot 800 depicts the battery current, and includes an initial current of 4 A, a decrease to 2.5 A from t0-t1 (point 801) when the battery is connected to the VBUS, followed by an increase back to 4 A. The decrease represents a failure to charge the battery due to a failure on the sink path.

The plot 805 depicts an adaptor current, which is initially at zero when the FET is off. At a point 806, the sink FET goes to thermal trip due to a high current ramping up, reaching a limit of 1.5 A. This is a sink switch trip point.

Plot 810 depicts a voltage across the sink FET. dV is initially at 0 V and increases in two steps to 20 V while Vout is 0 V. dV then decreases to 16 V as Vout begins to increase.

Plot 815 depicts BC_AC_OK, which is asserted (high) at t0 and deasserted at t1 due to the tripping of the sink switch/FET.

Plots 820 depicts the FET Vin (plot 821) and Vout (plot 822). Vin increases in two steps from 0 V to its peak value, e.g., 20 V, at t0. Vout increases starting at t0 and reaches a peak level of about 4 V at t1 before decreasing back to 0 V.

Plot 825 depicts the sink FET enable signal from the EC. It goes high to enable the sink FET at t0, represented by the point 826, when the EC receives an adapter connect notification. In particular, the PD manager of the power-sinking device receives a 20V contract PS_RDY message from the power source, and provides the message to the EC.

Plot 830 depicts PD manager-to-EC I2C transactions. A time period 831 denotes the EC receiving Standard Power Range (SPR) Power Delivery Objects (PDOs) from the power source/charger. PDOs are used by a USB-PD charger to advertise its voltage, including the nature and type of the voltage supply.

Figure 9:
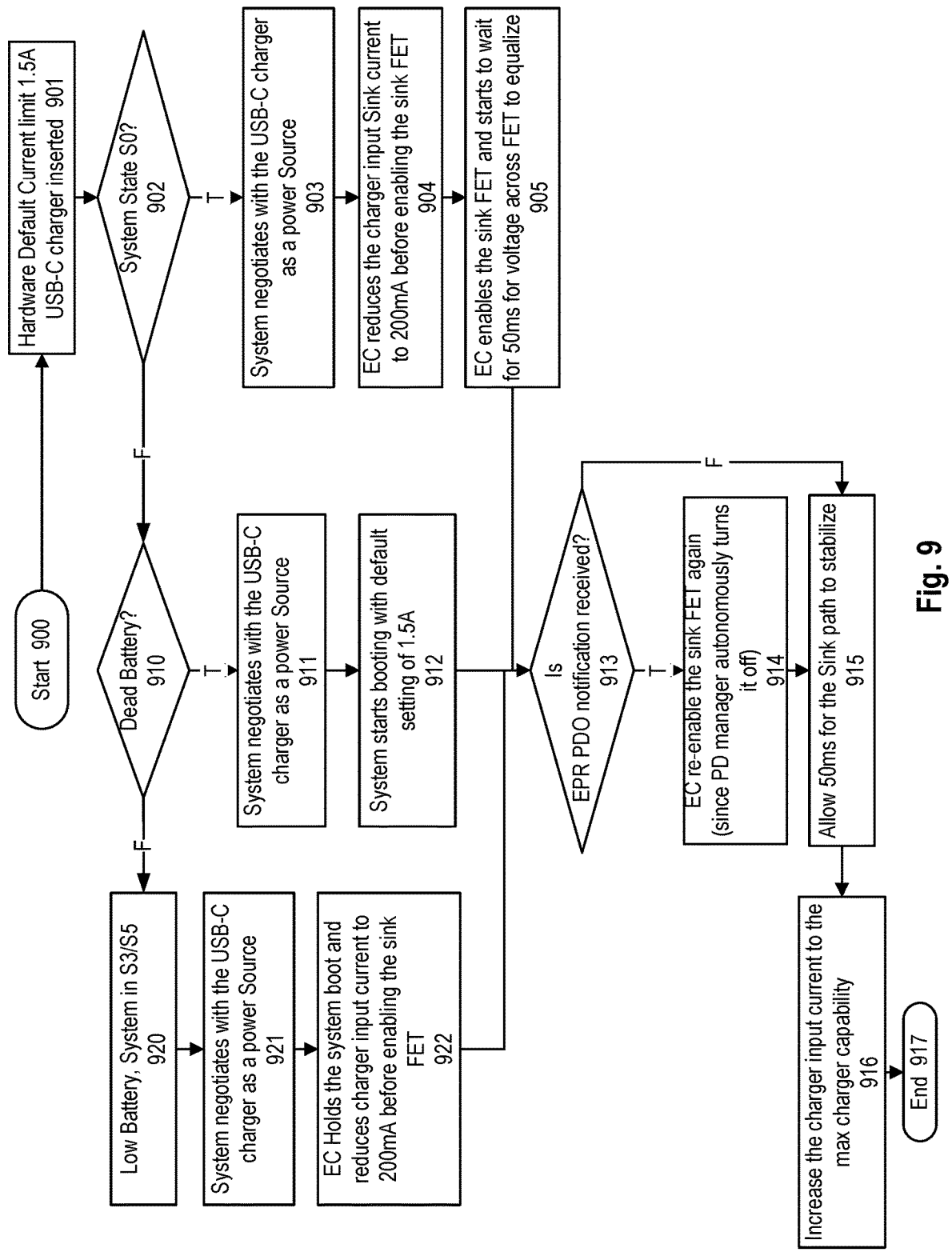
FIG. 9 depicts an example flow chart/state diagram of a process for use at a power-sinking device, in accordance with various embodiments.

FIG. 9 depicts an example flow chart/state diagram of a process for use at a power-sinking device, in accordance with various embodiments. The process starts at a block 900. At a block 901, a hardware default current limit is set to 1.5 A, for example, when a USB-C charger (adapter) is inserted into a USB port of the power-sinking device. A decision block 902 determines whether the system (the power-sinking device) is in the S0 state. If the decision block 902 is true, a block 903 is reached where the system negotiates with the USB-C charger as a power Source. At block 904, the EC reduces the charger input Sink current to 200 mA, for example, before enabling the sink FET. This can involve programming the current limit in the battery charger. Block 905 involves the EC enabling (turning on) the sink FET and starting a wait period of at least 50 ms, for example, to allow the voltage across the FET to equalize.

If the decision block 902 is false (F), a decision block 910 determines whether the power-sinking device has a dead battery (also referred to as the G3 state). If the decision block 910 is true, at a block 911, the system negotiates with the USB-C charger as a power Source. At block 912, the system starts booting (to the S0 state) with a default setting of 1.5 A as the current limit.

If the decision block 910 is false, block 920 indicates there is a low battery and the system is in the S3 or S5 state. At block 921, the system negotiates with the USB-C charger as a power Source. At block 922, the System (EC) holds (delays) the boot (e.g., by asserting BATLOW_) and reduces the charger input sink current to 200 mA, for example, before enabling the sink FET.

After blocks 905, 912 and 922, a decision block 913 determines whether an EPR PDO notification is received. Such a notification will be received if an EPR power level is requested, e.g., above 100 W, by the power-sinking device. If the decision block is false, block 915 allows at least 50 ms for the Sink path to stabilize. In this case, the requested power level is at the SPR level or less than 100 W. Block 916 involves the EC increasing the charger input current to the maximum charger capability, e.g., 3-5 A. This can involve programming the current limit in the battery charger. The process ends at block 917.

If the decision block 913 is true, block 914 involves the EC re-enabling the sink FET again (since the PD manager autonomously turns it off). In this case, the requested power level is at the EPR power level. The power delivery manager may autonomously turn off the transistor in response to receipt of the EPR notification. Generally, the power delivery manager may autonomously turn off the transistor to meet the psinkstandby limit as called out in the USB PD3.x specification.

Figure 10:
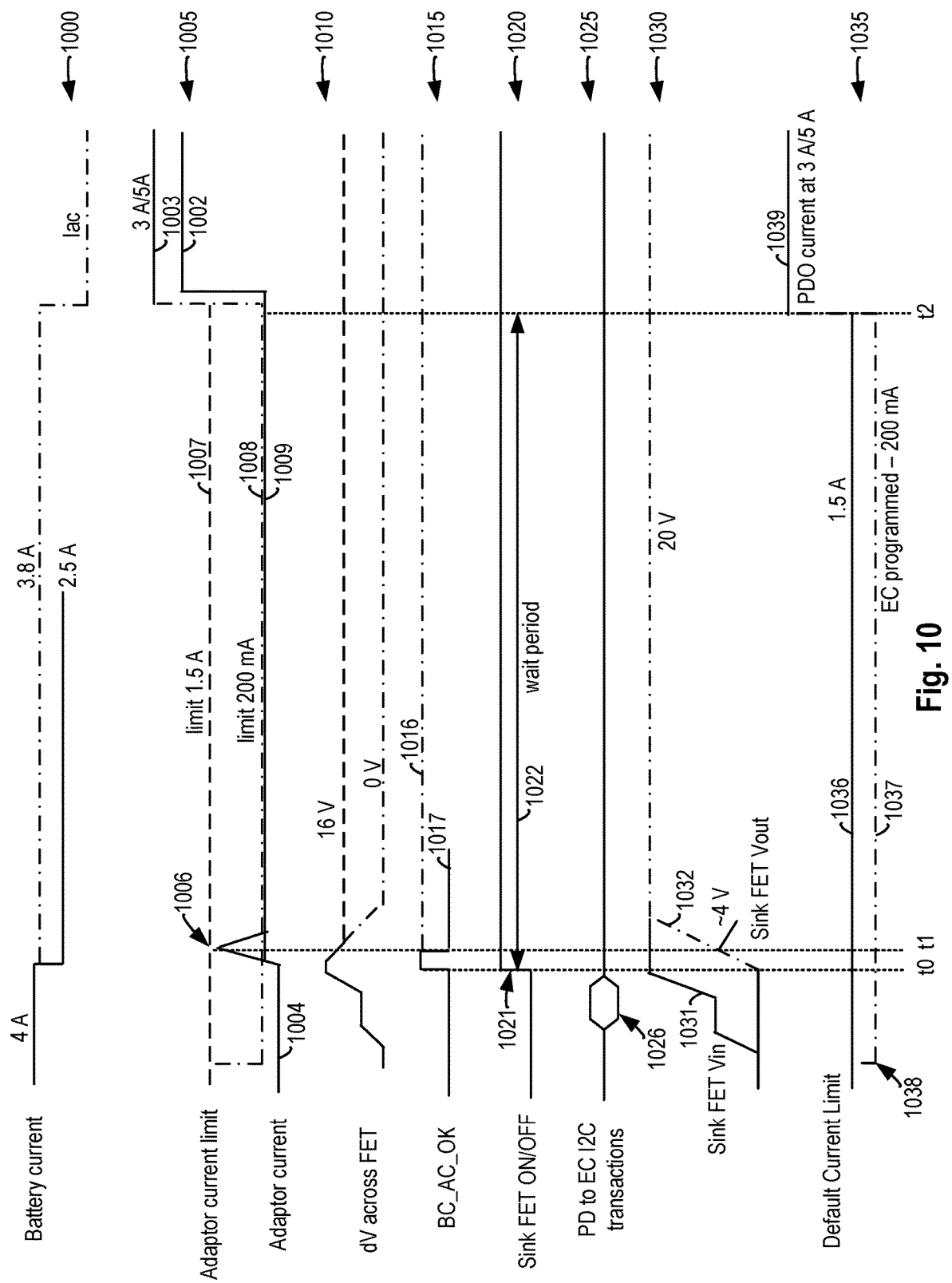
FIG. 10 depicts example plots in a power delivery scenario, where a battery of a power-sinking device is charged and the device is in the S0 state when a Standard Power Range (SPR) adapter/charger is plugged in, in accordance with various embodiments.

FIG. 10 depicts example plots in a power delivery scenario, where a battery of a power-sinking device is charged and the device is in the S0 state when a Standard Power Range (SPR) adapter/charger is plugged in, in accordance with various embodiments.

The plots 1000 depict a battery current due to system load, and includes an initial current of 4 A, when the FET is off. The battery mode discharge current is 2.5 A in the failure scenario and 3.8 A in the success scenario. After t1, a reduced, AC mode charging current (Iac) is used in the success scenario.

The plots 1005 depict an adaptor current. The adaptor current is initially at zero when the FET is off (plot 1004). At a point 1006, the FET goes to thermal trip, reaching a limit of 1.5 A (plot 1007) in the failure scenario. A lower limit of 200 mA (plot 1008) is also depicted in a success scenario. The current remains at the 200 mA limit in the success scenario (plot 1009) until t1. The current limit may subsequently increase to, e.g., 3 A or 5 A (plot 1003) after t1, respectively, so that the sink FET supports a higher current. The current may increase to a level (plot 1002) which is less than, or as high as, the limit of plot 1003.

Plot 1010 depicts a voltage across the sink FET. dV is initially at 0 V and increases in two steps to 20 V while Vout is 0 V. In the failure scenario, dV decreases to about 16 V at which the thermal trip occurs. In the success scenario, dV then decreases to 0 V as Vout equalizes with Vin.

Plot 1015 depicts BC_AC_OK. In a failure scenario, it is asserted (high) at t0 and deasserted at t1 due to the tripping of the sink switch/FET (plot 1017). In a success scenario, it remains asserted after t2 (plot 1016) so that the battery continues to be connected to VBUS.

Plot 1020 depicts the sink FET enable signal. It goes high to enable the sink FET at t0, represented by a point 1021, and remains high. A wait period 1022 is started when the FET is enabled at t0, and ends at t2.

Plot 1025 depicts PD manager-to-EC I2C transactions. These are transactions between the PD Manager and the EC via an I2C bus. A time period 1026 denotes the EC receiving Standard Power Range (SPR) Power Delivery Objects (PDOs) from the power source/charger via the PD manager.

Plots 1030 depict Vin and Vout of the FET. Plot 1031 depicts Vin, which increases in two steps from 0 V to its peak value, e.g., 20 V, at t0. At t0, the PD manager of the power-sinking device receives a 20V contract PS_RDY message from the power source, in response to which it enables the FET. A plot 1032 depicts Vout, which increases starting at t0 and reaches the peak level of, e.g., 20 V after t1.

Plots 1035 depict a default current limit. In the failure scenario, at plot 1036, the current limit is 1.5 A, and subsequently increases at t2 to a higher level such as the PDO current of 3 A/5 A (plot 1039). In the success scenario, at plot 1037, the current limit is reduced to 200 mA, for example. The reduced level is set (point 1038) before the sink FET is enabled (point 1021). After the wait period 1022 expires at t2, the current limit is increased from 200 mA to 3 A/5 A, for example.

Figure 11:
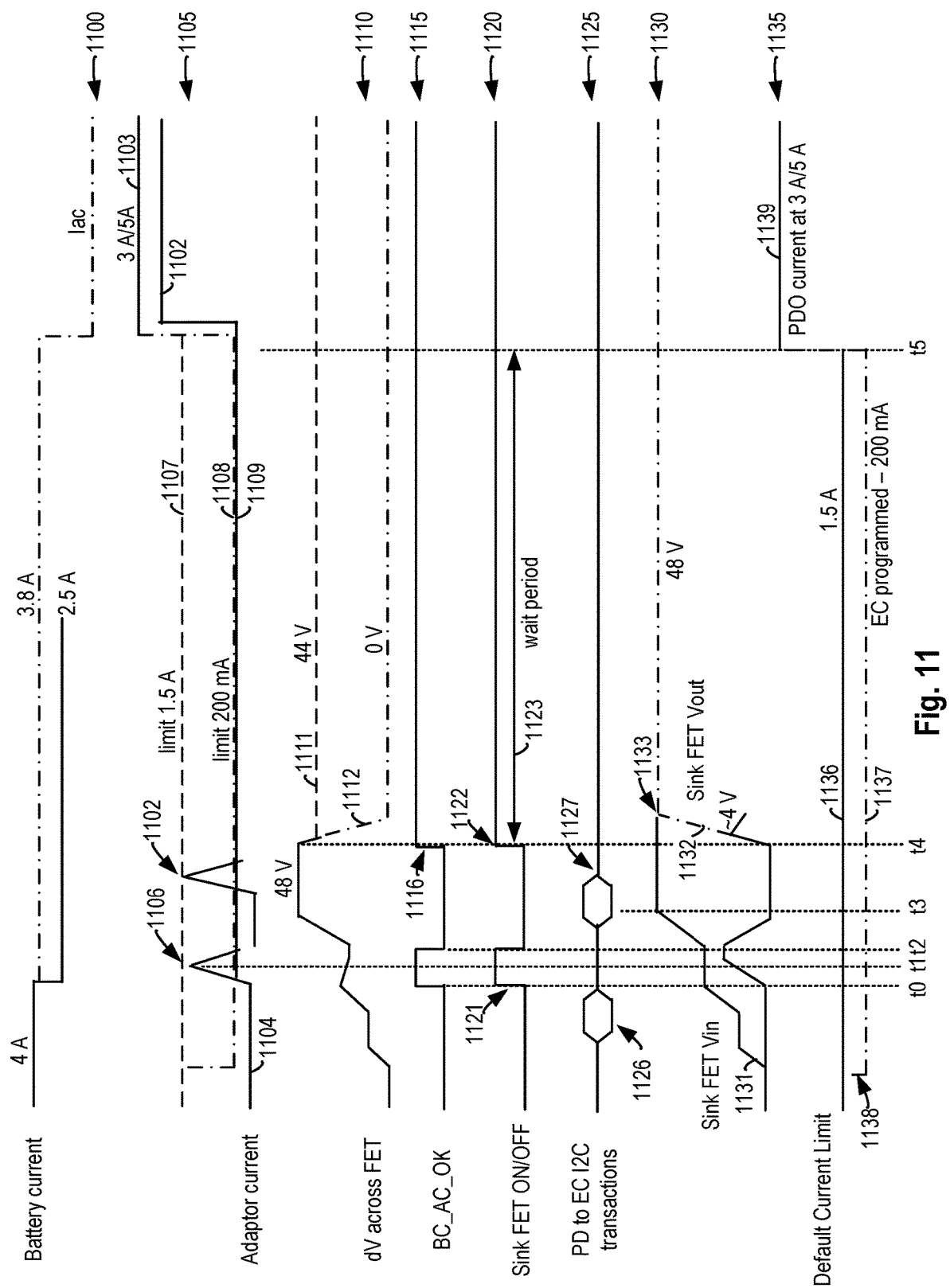
FIG. 11 depicts example plots in a power delivery scenario, where a battery of a power-sinking device is charged and the device is in the S0 state when an EPR adapter/charger is plugged in, in accordance with various embodiments.

FIG. 11 depicts example plots in a power delivery scenario, where a battery of a power-sinking device is charged and the device is in the S0 state when an EPR adaptor/charger is plugged in, in accordance with various embodiments.

The plots 1100 depict a battery current due to system load, and includes an initial current of 4 A, when the FET is off. The battery mode discharge current is 2.5 A in the failure scenario and 3.8 A in the success scenario. After t5, a reduced, AC mode charging current (Iac) is used in the success scenario.

The plots 1105 depict an adaptor current. The adaptor current is initially at zero when the FET is off (plot 1104). At points 1106 and 1102, the FET goes to thermal trip, reaching a limit of 1.5 A (plot 1107) in the failure scenario. A lower limit of 200 mA (plot 1108) is also depicted in a success scenario, where the current remains at the reduced level (plot 1109) until t5. The current limit may subsequently increase to 3 A or 5 A (plot 1103) after t5, respectively, so that the sink FET supports a higher current. The current may increase to a level (plot 1102) which is less than, or as high as, the limit of plot 1103.

Plots 1110 depict a voltage across the sink FET. dV is initially at 0 V and increases in three steps to 48 V. Vout is 0 V in the first and second steps. dV then decreases to 0 V as Vout equalizes with Vin (plot 1112) in the success scenario. In the failure scenario, dV remains at a high level such as 44 V (plot 1111).

Plot 1115 depicts BC_AC_OK. It is asserted (high) at t0 and deasserted at t2 due to the tripping of the sink switch/FET. BC_AC_OK is then asserted high again at t4 (point 1116).

Plot 1120 depicts the sink FET enable signal. It goes high to enable the sink FET at t0, represented by a point 1121, then returns to a non-enable state at t2, when the PD manager autonomously turns it off when it provides a >20V (EPR) contract ACCEPT message to the power source. It goes high again at t4 (point 1122) and remains high. The first enabling corresponds to block 905 in FIG. 9 and the second enabling corresponds to block 914. A wait period 1123 is started when the FET is enabled at the point 1122, and ends at t5.

Plot 1125 depicts PD manager-to-EC I2C transactions. The time period 1126, before t0, denotes the EC receiving SPR PDOs from the power source/charger. The time period 1127, after t2, denotes the EC receiving EPR PDOs from the power source/charger.

Plots 1130 depict Vin and Vout of the FET. Plot 1131 depicts Vin, which increases in three steps from 0 V to its peak value, e.g., 48 V, at t3. A plot 1132 depicts Vout, which increases starting at t0 and reaches a reduced level such as ~4 V before decreasing back to 0 V. Vout then increases again until it reaches 48 V at the point 1133 in the success scenario. In the failure scenario, Vout increases to only about 4 V.

Plots 1135 depict a default current limit. In the failure scenario, at plot 1136, the current limit is 1.5 A, and subsequently increases at t5 to a higher level such as the PDO current of 3 A/5 A (plot 1139). In the success scenario, at plot 1137, the current limit is reduced to 200 mA, for example. The reduced level is set (point 1138) before the sink FET is enabled (points 1121 and 1122). After the wait period 1123 expires at t5, the current limit is increased from 200 mA to 3 A/5 A, for example.

At t0, the PD manager receives the 20V contract PS_RDY message, in response to which it enables the FET. t1 represents the sink switch/FET trip point. At t2, the PD manager provides a >20V (EPR) contract ACCEPT message to the power source. At t3, the PD Manager receives a >20V contract PS_RDY message.

Figure 12:
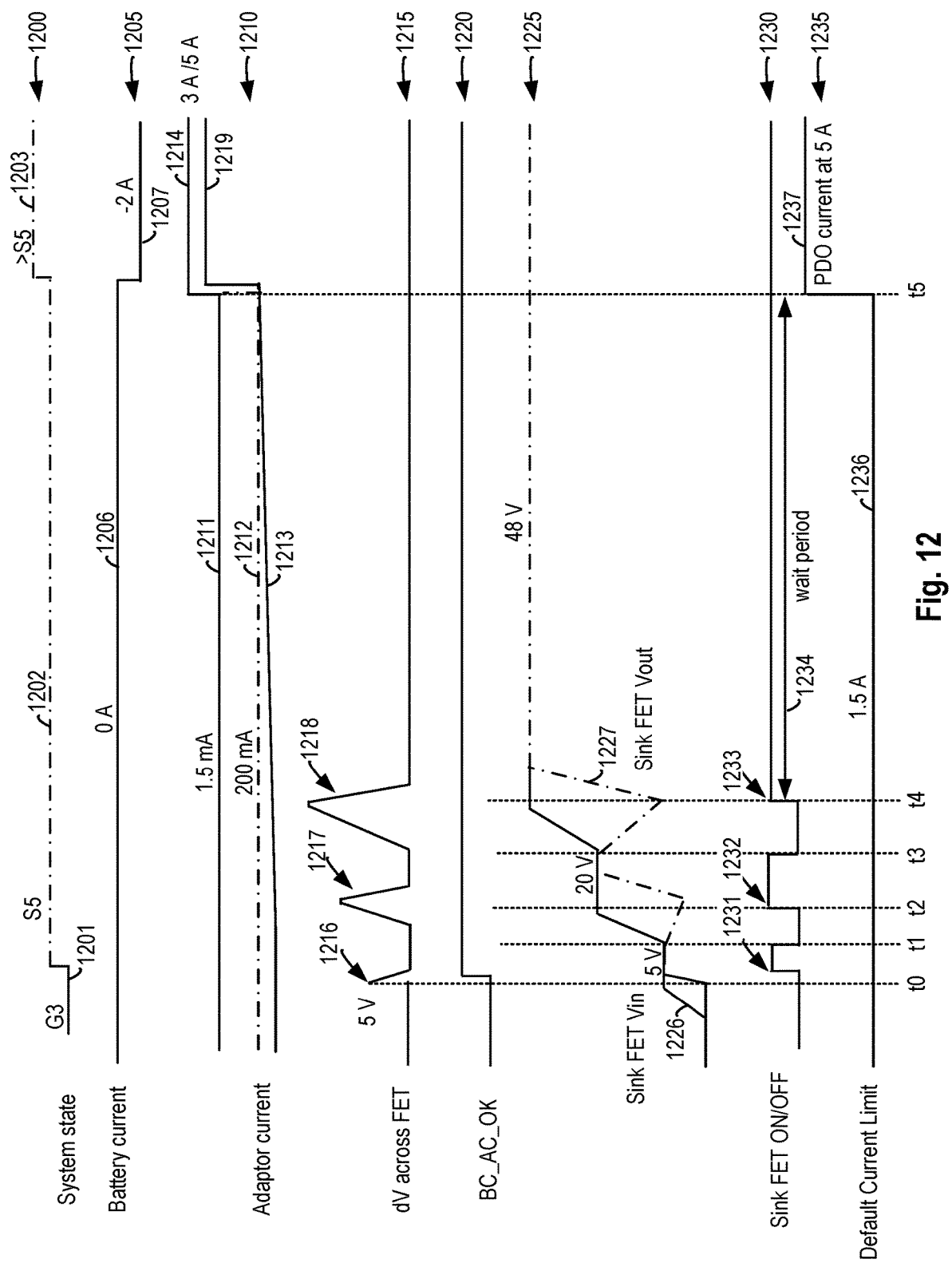
FIG. 12 depicts example plots in a power delivery scenario, where a battery of a power-sinking device is in a low charge state, and the device is in the G3 state when an EPR adapter/charger is plugged in, in accordance with various embodiments.

FIG. 12 depicts example plots in a power delivery scenario, where a battery of a power-sinking device is in a low charge state, and the device is in the G3 state (low/dead battery state) when an EPR adaptor/charger is plugged in, in accordance with various embodiments. Two series-connected batteries are used having a voltage of <1 V, indicating a low or dead battery charge state.

Plots 1200 depicts the system state. The system state is initially at G3 or the dead battery state (plot 1201), then transitions to the S5 shutdown or off state (plot 1202) before transitioning to a higher, more awake state (>S5) (plot 1203) after t5. This could be the S0 state, for example.

The plots 1205 show that the battery current is 0 A (plot 1206) while the system state is G3 and S5, and ~2 A (plot 1207) when the system state is >S5.

Plots 1210 depict the adaptor current. A current limit of 1.5 mA (plot 1211) or 200 mA (plot 1212) is set before t5 in the failure or success scenario, respectively. The current limit can be set at the start to the implicit power contract minimum value of 1.5 A. After t5, the current limit increases to 5 A (plot 1214), for example. The current (plot 1213) ramps up slowly below the 200 mA limit until t5, after which it steps up to a higher level (plot 1219) such as 3 A which is below the increased limit. The current may increase to a level (plot 1219) which is less than, or as high as, the limit of plot 1214. The slow ramp up is due to the low battery state.

Plots 1215 depict the dV across the FET. dV transitions from 0 V to 5 V at t0, then returns to 0 V in a first spike (plot 1216). dV then transitions in a second spike (point 1217) and a third spike (plot 1218), each with an increasing peak magnitude.

Plot 1220 depicts BC_AC_OK, which transitions high after t0.

Plots 1225 depict Vin and Vout of the FET. Plot 1226 depicts Vin, which increases in three steps from 0 V to its peak value, e.g., 48 V, at t4, with steps at 5 V and 20 V, for example. Vin increases in steps as per the USB ORG PD 3.0 or PD3.1 specification. The power contract starts with a 5V default voltage. Then it enters into a Standard Power Range (SPR) contract that provides a maximum of 20V. After entering this stage, if both the USB-C adapter and the device (power sink) support Extended Power Range (EPR) operation, they agree to go to higher voltage contracts. The SPR contract operation can occur at 9V, 15V or 20V fixed voltages. Or, at any voltage between 3V and 21V with a Programmable Power Supply (PPS) feature as defined in the PD3.0 Specification. The EPR operation can occur at 28V, 36V or 48V fixed voltages. Or, at any voltage between 15V and 48V with an Adjustable Voltage Supply (AVS) feature as defined in the PD3.1 Specification.

A plot 1227 depicts Vout, which increases starting at t0 and reaches a reduced level such as ~4 V before decreasing back to 0 V. Vout then increases again until it reaches 48 V at the point 1133.

The PD manager provides a 20V contract ACCEPT message at t1 to the power source, receives a 20V contract PS_RDY message t2 from the power source, provides a >20V (EPR) contract ACCEPT message at t3 to the power source, and receives a >20V (EPR) contract PS_RDY message at t4 from the power source.

Plot 1230 depicts the sink FET enable signal. It temporarily goes high to enable the sink FET at points 1231 and 1232, then goes high again at point 1233. A wait period 1234 is started when the FET is enabled at the point 1233, and ends at t5.

Plots 1235 depict a default current limit. The current limit is initially at 1.5 A (plot 1236), then steps up to the PDO current of 5 A (plot 1237) at t5, for instance, at the end of the wait period. In other words, the EC boots up and writes the final PDO current to the battery charger after the 50 mS delay to allow the SINK path voltage to settle.

At point 1217, the PD manager enables the SINK FET in an Implicit power contract.

At t1, the PD manager provides a 20V contract ACCEPT message to the power source. The PD manager accepts the 20V profile and turns off the SINK FET to meet the PsinkStdBy requirement.

At t2, the PD manager receives a 20V contract PS_RDY message from the power source, in response to which it enables the FET.

At t3, the PD manager provides a >20V (EPR) contract ACCEPT message to the power source. In this case, the PD accepts the >20V (EPR) profile and turns off the SINK FET to meet the PsinkStdBy requirement.

At t4, the PD manager receives a >20V (EPR) contract PS_RDY message from the power source, in response to which it again enables the SINK FET.

Figure 13:
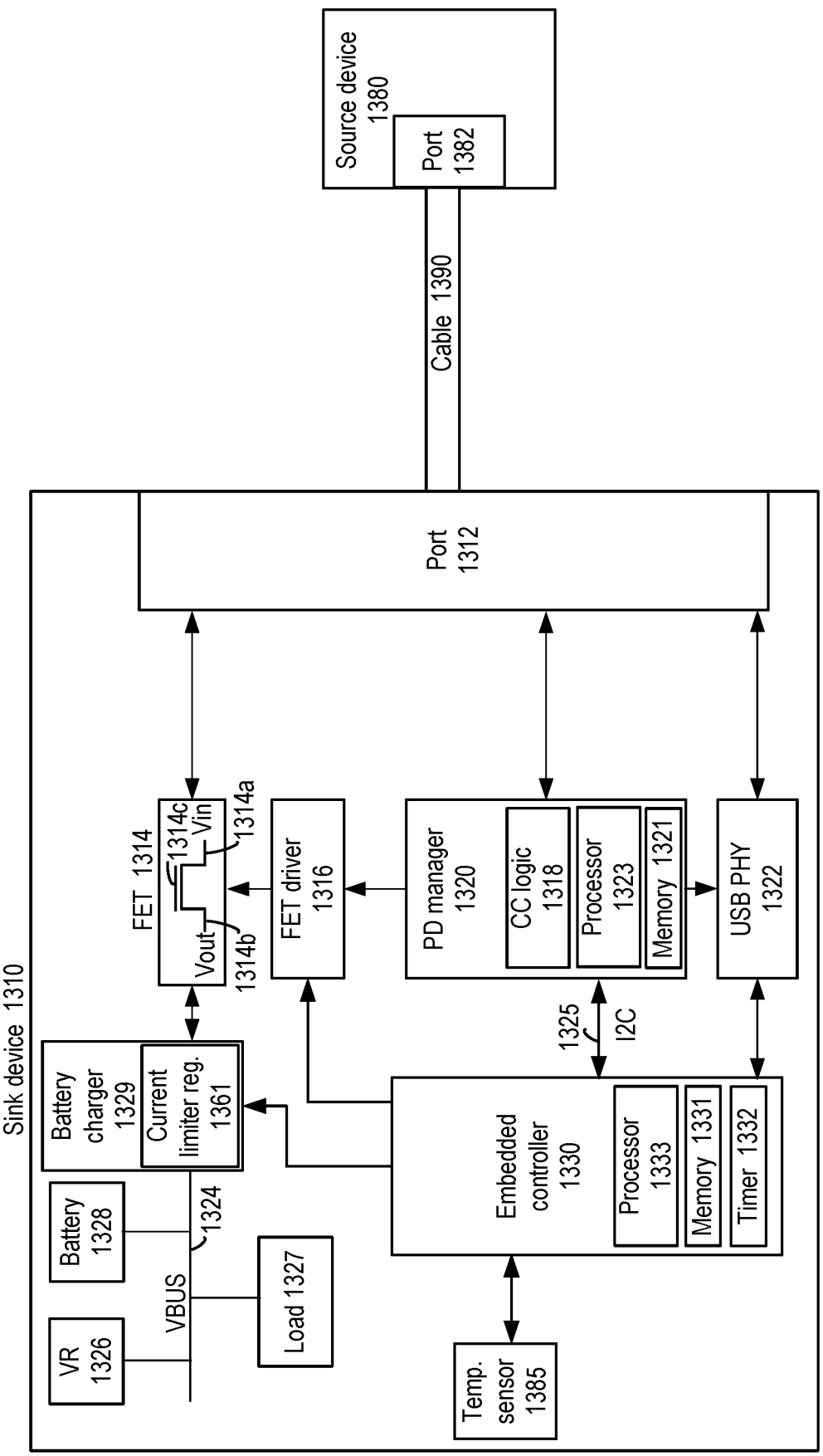
FIG. 13 depicts an example block diagram of a system 1300 which includes a power-sinking device 1310 and an external power source device 1380, in accordance with some embodiments.

FIG. 13 depicts an example block diagram of a system 1300 which includes a power-sinking device 1310 and an external power source device 1380, in accordance with some embodiments. The sink device can be any computing device which can receive power to operate circuits in the device and/or to charge up an associated battery. Examples include computing devices such as laptops, tablets and smartphones. The source device can be any device which is capable of supplying power to the sink device. Examples include an alternating current (AC)-powered adapter/wall charger, or a powered host or hub. The devices are all compatible with the USB specification, in one example implementation. For instance, they may be compatible with USB Type-C, which is a specification for a reversible USB connector that has a small form factor, and USB-PD, which is a power delivery protocol.

The sink device includes a port, e.g., socket or receptacle, into which a connector of a USB cable 1390 can be plugged. The connector at the opposing end of the cable can be plugged into a port 1382 of the source device. The port 1312 is coupled to a number of components including a FET 1314, a PD manager/controller 1320 and USB physical layer (PHY) circuit 1322. The FET, also referred to as a sink FET, is coupled to a battery charger 1329 which in turn is coupled to a power bus 1324.

The battery charger may include a current limiter register (reg.) 1361 which is updated by the EC to set a current limit. This is an example of a programmable current limiter. In another possible implementation, the battery charger includes a current limiter circuit and a digital potentiometer. The digital potentiometer provides a variable resistance which is used to control the current limiter. The EC provides a programming signal which increments an up/down counter to select a resistance which corresponds to a desired current limit. The current limiter circuit may provide a current limit which is a function of a voltage across the resistance, where this voltage serves as a reference for an internal current-limiting amplifier. There are other efficient techniques for the current limiting as well.

The power bus is coupled to a voltage regulator (VR) 1326 and a battery 1328. When the device 1310 is plugged into AC power, the VR can supply power to the power bus 1324. If the AC power is not used, the device can receive power from the battery or the source device. The battery charger can be programmed by the EC 1330 to set different current limits as described herein. See also FIG. 13.

The FET can be MOSFET, for example, which includes source/drain terminals 1314a and 1314b (second and first terminals, respectively). When the FET is receiving power from the source device, the terminal 1314a is the drain at a voltage Vin and the terminal 1314b is the source with a voltage Vout. The FET is coupled on one side (1314b) to a power bus and on an opposing side (1314a) to a Universal Serial Bus (USB) port 1312.

The control gate 1314c of the FET is driven by a FET driver 1316, which in turn may be responsive to the EC or the PD manager to receive an enable or disable voltage. The FET driver provides a turn on or turn off voltage to the FET when it is enabled or disabled, respectively, e.g., in response to the PD manager and/or EC controller. Turning on refers to making the transistor conductive, e.g., in channel between source drain terminals. Note that another type of transistor other than a FET could be used. Also, another type of switching device or switch other than a transistor could be used.

The PD manager may be a controller or other circuit which implements a state machine to perform various tasks such as supporting USB PD negotiations, controlling the PHY circuit and driving the CC lines. The USB PD manager can tell the PHY which packets to send, such as to advertise a power level, request a power level and acknowledge a channel power level. The PD manager may include a memory 1321 to store firmware or other instructions which are to be executed by a processor 1323. The PD manager can communicate messages it receives from the source device to the EC via an I2C bus 1325. The PD manager can also include a configuration channel (CC) logic circuit 1318 which detects the presence of the cable and determines its orientation and current-carrying capability.

The PHY circuit serves as an interface to the USB's D+ and D− lines, which indicates the device speed.

The embedded controller (EC) may be a microcontroller which includes a processor 1333, memory 1331, a timer 1332 and input/output (I/O) peripherals on a single chip, for example. The memory 1331 may store firmware or other instructions which are to be executed by the processor 1333. The time can be used to implement the wait period for increasing the current limit in the battery charger. The sink device and source device can be configured to provide the features discussed herein.

The EC may further communicate with a temperature sensor 1385 to obtain data indicating a temperate of the device 1310. The EC can adjust the wait period based on the temperature. In one approach, the sensed temperature is a temperature of the SINK FET/load switch and the wait period is adjusted based on the switch characteristics. The wait period can be set as a function of temperature. Transistors typically have a negative coefficient of temperature, e.g., they conduct more freely and have a low threshold voltage with a rise in temperature. Accordingly, in one approach, when the temperature is greater than a threshold temperature, the wait period can be decreased below a default level as the FET may turn on more quickly at higher temperatures. Similarly, when the temperature is lower than the threshold, the wait period can be increased. The specific temperature-based characteristics of the transistor or other sink switch device can be considered in adjusting the wait period as a function of temperature. In one approach, EC compares a sensed temperature to one or more threshold temperatures to classify the temperate into two or more ranges, and adjusts the wait period based on the selected range.

One possible example of a temperature sensor integrates anti-parallel electrically isolated polysilicon diodes on a MOSFET die for temperature sensing. With such devices, an external circuit is used to sense temperature based on the temperature-dependent forward voltage drop of the diodes.

In some implementations, the source device has a similar design as the sink device.

Figure 14:
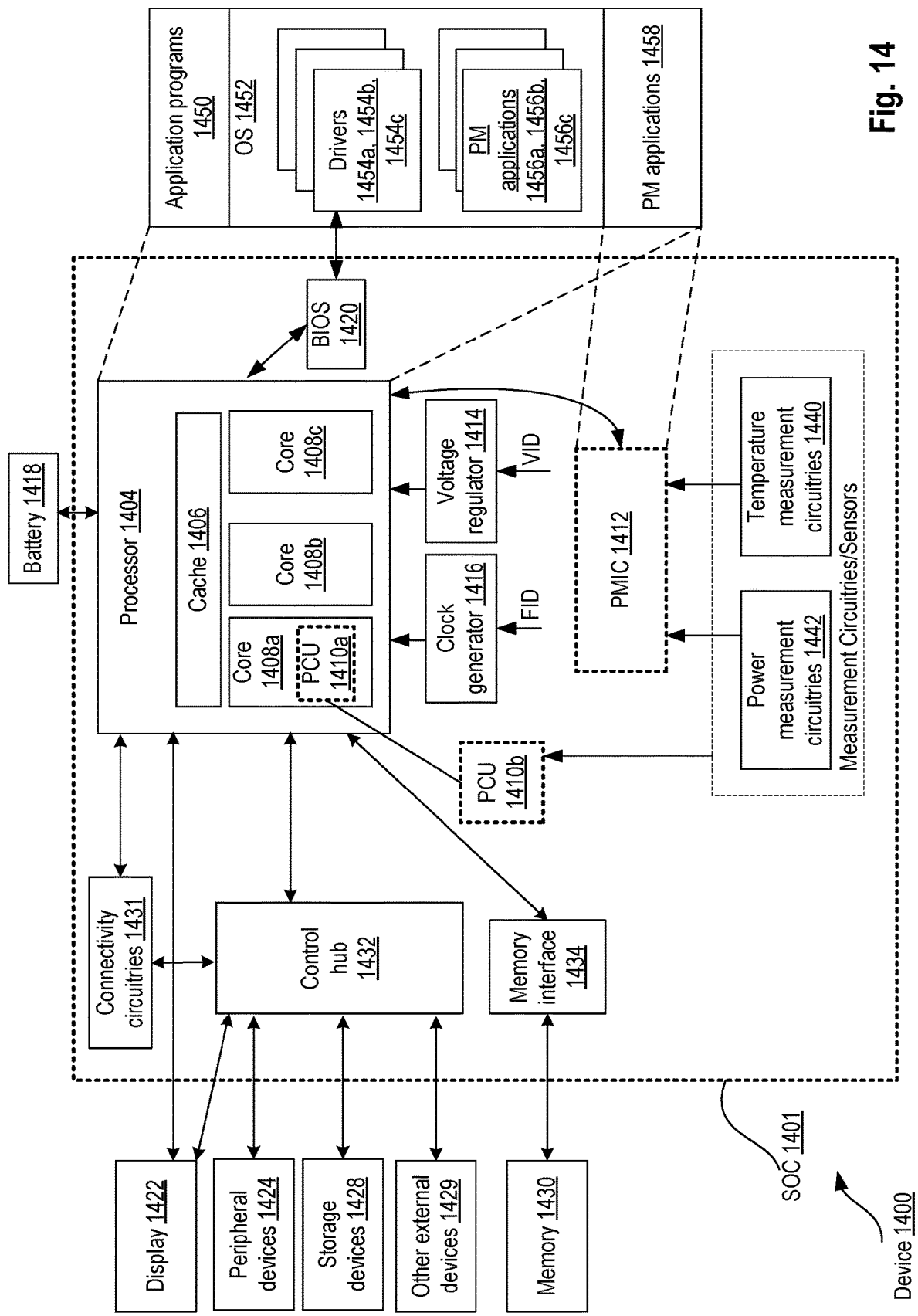
FIG. 14 depicts a computing device with apparatus and/or software for charger input-limit current identification to resolve USB-C FET damage, in accordance with some embodiments.

FIG. 14 depicts a computing device with apparatus and/or software for charger input-limit current identification to resolve USB-C FET damage, in accordance with some embodiments.

In some embodiments, device 1400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. The device 1400 may be a sink device as described herein. The one or more peripheral devices 1424 may include the power source device 1380. The processor 1404 may represent the processors 1323 and/or 1333.

It will be understood that certain components are shown generally, and not all components of such a device are shown in device 1400. The apparatus and/or software for controlling wake sources in a system to reduce power consumption in sleep state can be in the wireless connectivity circuitries 1431, PCU 1410, and/or other logic blocks (e.g., operating system 1452) that can manage power for the computer system.

In an example, the device 1400 comprises a circuit 1401 such as a System-on-Chip (SoC), a single integrated circuit/chip, a package comprising multiple integrated circuits, or a stacked tile/chiplet design or other system-in-a-package design that include multiple chips. An example boundary of the circuit 1401 is illustrated using dotted lines in FIG. 14, with some example components being illustrated to be included within circuit 1401. However, circuit 1401 may include any appropriate components of device 1400.

In some embodiments, device 1400 includes processor 1404. Processor 1404 can include one or more physical devices, such as microprocessors, application processors, microcontrollers, programmable logic devices, processing cores, or other processing means. The processing operations performed by processor 1404 include the execution of an operating platform or operating system on which applications and/or device functions are executed. The processing operations include operations related to I/O (input/output) with a human user or with other devices, operations related to power management, operations related to connecting computing device 1400 to another device, and/or the like. The processing operations may also include operations related to audio I/O and/or display I/O.

In some embodiments, processor 1404 includes multiple processing cores (also referred to as cores) 1408a, 1408b, 1408c. Although merely three cores 1408a, 1408b, 1408c are illustrated in FIG. 14, processor 1404 may include any other appropriate number of processing cores, e.g., tens, or even hundreds of processing cores. Processor cores 1408a, 1408b, 1408c may be implemented on a single integrated circuit (IC) chip. Moreover, the chip may include one or more shared and/or private caches, buses or interconnections, graphics and/or memory controllers, or other components.

In some embodiments, processor 1404 includes cache 1406. In an example, sections of cache 1406 may be dedicated to individual cores 1408a-c (e.g., a first section of cache 1406 dedicated to core 1408a, a second section of cache 1406 dedicated to core 1408b, and so on). In an example, one or more sections of cache 1406 may be shared among two or more of cores 1408. Cache 1406 may be split in different levels, e.g., level 1 (L1) cache, level 2 (L2) cache, level 3 (L3) cache, etc.

In some embodiments, processor core 1404 may include a fetch unit to fetch instructions (including instructions with conditional branches) for execution by the core 1404. The instructions may be fetched from any storage devices such as the memory 1430. Processor core 1404 may also include a decode unit to decode the fetched instruction. For example, the decode unit may decode the fetched instruction into a plurality of micro-operations. Processor core 1404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 1404 may be an out-of-order processor core in one embodiment. Processor core 1404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 1404 may also include a bus unit to enable communication between components of processor core 1404 and other components via one or more buses. Processor core 1404 may also include one or more registers to store data accessed by various components of the core 1404 (such as values related to assigned application priorities and/or sub-system states (modes) association.

In some embodiments, device 1400 comprises connectivity circuitries 1431. For example, connectivity circuitries 1431 includes hardware devices (e.g., wireless and/or wired connectors and communication hardware) and/or software components (e.g., drivers, protocol stacks), e.g., to enable device 1400 to communicate with external devices. Device 1400 may be separate from the external devices, such as other computing devices, wireless access points or base stations, etc.

In an example, connectivity circuitries 1431 may include multiple different types of connectivity. To generalize, the connectivity circuitries 1431 may include cellular connectivity circuitries, wireless connectivity circuitries, etc. Cellular connectivity circuitries of connectivity circuitries 1431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 1431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 1431 may include a network interface, such as a wired or wireless interface, e.g., so that a system embodiment may be incorporated into a wireless device, for example, a cell phone or personal digital assistant.

In some embodiments, device 1400 comprises control hub 1432, which represents hardware devices and/or software components related to interaction with one or more I/O devices. For example, processor 1404 may communicate with one or more of display 1422, one or more peripheral devices 1424, storage devices 1428, one or more other external devices 1429, etc., via control hub 1432. Control hub 1432 may be a chipset, a Platform Control Hub (PCH), and/or the like.

For example, control hub 1432 illustrates one or more connection points for additional devices that connect to device 1400, e.g., through which a user might interact with the system. For example, devices (e.g., devices 1429) that can be attached to device 1400 include microphone devices, speaker or stereo systems, audio devices, video systems or other display devices, keyboard or keypad devices, or other I/O devices for use with specific applications such as card readers or other devices.

As mentioned above, control hub 1432 can interact with audio devices, display 1422, etc. For example, input through a microphone or other audio device can provide input or commands for one or more applications or functions of device 1400. Additionally, audio output can be provided instead of, or in addition to display output. In another example, if display 1422 includes a touch screen, display 1422 also acts as an input device, which can be at least partially managed by control hub 1432. There can also be additional buttons or switches on computing device 1400 to provide I/O functions managed by control hub 1432. In one embodiment, control hub 1432 manages devices such as accelerometers, cameras, light sensors or other environmental sensors, or other hardware that can be included in device 1400. The input can be part of direct user interaction, as well as providing environmental input to the system to influence its operations (such as filtering for noise, adjusting displays for brightness detection, applying a flash for a camera, or other features).

In some embodiments, control hub 1432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 1422 represents hardware (e.g., display devices) and software (e.g., drivers) components that provide a visual and/or tactile display for a user to interact with device 1400. Display 1422 may include a display interface, a display screen, and/or hardware device used to provide a display to a user. In some embodiments, display 1422 includes a touch screen (or touch pad) device that provides both output and input to a user. In an example, display 1422 may communicate directly with the processor 1404. Display 1422 can be one or more of an internal display device, as in a mobile electronic device or a laptop device or an external display device attached via a display interface (e.g., DisplayPort, etc.). In one embodiment display 1422 can be a head mounted display (HMD) such as a stereoscopic display device for use in virtual reality (VR) applications or augmented reality (AR) applications.

In some embodiments, and although not illustrated in the figure, in addition to (or instead of) processor 1404, device 1400 may include Graphics Processing Unit (GPU) comprising one or more graphics processing cores, which may control one or more aspects of displaying contents on display 1422.

Control hub 1432 (or platform controller hub) may include hardware interfaces and connectors, as well as software components (e.g., drivers, protocol stacks) to make peripheral connections, e.g., to peripheral devices 1424.

It will be understood that device 1400 could both be a peripheral device to other computing devices, as well as have peripheral devices connected to it. Device 1400 may have a "docking" connector to connect to other computing devices for purposes such as managing (e.g., downloading and/or uploading, changing, synchronizing) content on device 1400. Additionally, a docking connector can allow device 1400 to connect to certain peripherals that allow computing device 1400 to control content output, for example, to audiovisual or other systems.

In addition to a proprietary docking connector or other proprietary connection hardware, device 1400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 1431 may be coupled to control hub 1432, e.g., in addition to, or instead of, being coupled directly to the processor 1404. In some embodiments, display 1422 may be coupled to control hub 1432, e.g., in addition to, or instead of, being coupled directly to processor 1404.

In some embodiments, device 1400 comprises memory 1430 coupled to processor 1404 via memory interface 1434. Memory 1430 includes memory devices for storing information in device 1400.

Memory can include nonvolatile (state does not change if power to the memory device is interrupted) and/or volatile (state is indeterminate if power to the memory device is interrupted) memory devices. Memory device 1430 can be a dynamic random-access memory (DRAM) device, a static random-access memory (SRAM) device, flash memory device, phase-change memory device, or some other memory device having suitable performance to serve as process memory. In one embodiment, memory 1430 can operate as system memory for device 1400, to store data and instructions for use when the one or more processors 1404 executes an application or process. Memory 1430 can store application data, user data, music, photos, documents, or other data, as well as system data (whether long-term or temporary) related to the execution of the applications and functions of device 1400.

Elements of various embodiments and examples are also provided as a machine-readable medium (e.g., memory 1430) for storing the computer-executable instructions (e.g., instructions to implement any other processes discussed herein). The machine-readable medium (e.g., memory 1430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 1400 comprises temperature measurement circuitries 1440, e.g., for measuring temperature of various components of device 1400. In an example, temperature measurement circuitries 1440 may be embedded, or coupled or attached to various components, whose temperature are to be measured and monitored. For example, temperature measurement circuitries 1440 may measure temperature of (or within) one or more of cores 1408a, 1408b, 1408c, voltage regulator 1414, memory 1430, a mother-board of circuit 1401, and/or any appropriate component of device 1400.

In some embodiments, device 1400 comprises power measurement circuitries 1442, e.g., for measuring power consumed by one or more components of the device 1400. In an example, in addition to, or instead of, measuring power, the power measurement circuitries 1442 may measure voltage and/or current. In an example, the power measurement circuitries 1442 may be embedded, or coupled or attached to various components, whose power, voltage, and/or current consumption are to be measured and monitored. For example, power measurement circuitries 1442 may measure power, current and/or voltage supplied by one or more voltage regulators 1414, power supplied to circuit 1401, power supplied to device 1400, power consumed by processor 1404 (or any other component) of device 1400, etc.

In some embodiments, device 1400 comprises one or more voltage regulator circuitries, generally referred to as voltage regulator (VR) 1414. VR 1414 generates signals at appropriate voltage levels, which may be supplied to operate any appropriate components of the device 1400. Merely as an example, VR 1414 is illustrated to be supplying signals to processor 1404 of device 1400. In some embodiments, VR 1414 receives one or more Voltage Identification (VID) signals, and generates the voltage signal at an appropriate level, based on the VID signals. Various type of VRs may be utilized for the VR 1414. For example, VR 1414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 1410a/b and/or PMIC 1412. In some embodiments, each core has a network of distributed LDOs to provide efficient control for power management. The LDOs can be digital, analog, or a combination of digital or analog LDOs. In some embodiments, VR 1414 includes current tracking apparatus to measure current through power supply rail(s).

In some embodiments, device 1400 comprises one or more clock generator circuitries, generally referred to as clock generator 1416. Clock generator 1416 generates clock signals at appropriate frequency levels, which may be supplied to any appropriate components of device 1400. Merely as an example, clock generator 1416 is illustrated to be supplying clock signals to processor 1404 of device 1400. In some embodiments, clock generator 1416 receives one or more Frequency Identification (FID) signals, and generates the clock signals at an appropriate frequency, based on the FID signals.

In some embodiments, device 1400 comprises battery 1418 supplying power to various components of device 1400. Merely as an example, battery 1418 is illustrated to be supplying power to processor 1404. Although not illustrated in the figures, device 1400 may comprise a charging circuitry, e.g., to recharge the battery, based on Alternating Current (AC) power supply received from an AC adapter.

In some embodiments, device 1400 comprises Power Control Unit (PCU) 1410 (also referred to as Power Management Unit (PMU), Power Controller, etc.). In an example, some sections of PCU 1410 may be implemented by one or more processing cores 1408, and these sections of PCU 1410 are symbolically illustrated using a dotted box and labelled PCU 1410a. In an example, some other sections of PCU 1410 may be implemented outside the processing cores 1408, and these sections of PCU 1410 are symbolically illustrated using a dotted box and labelled as PCU 1410b. PCU 1410 may implement various power management operations for device 1400. PCU 1410 may include hardware interfaces, hardware circuitries, connectors, registers, etc., as well as software components (e.g., drivers, protocol stacks), to implement various power management operations for device 1400.

In some embodiments, device 1400 comprises Power Management Integrated Circuit (PMIC) 1412, e.g., to implement various power management operations for device 1400. In some embodiments, PMIC 1412 is a Reconfigurable Power Management ICs (RPMICs) and/or an IMVP (Intel® Mobile Voltage Positioning). In an example, the PMIC is within an IC chip separate from processor 1404. The may implement various power management operations for device 1400. PMIC 1412 may include hardware interfaces, hardware circuitries, connectors, registers, etc., as well as software components (e.g., drivers, protocol stacks), to implement various power management operations for device 1400.

In an example, device 1400 comprises one or both PCU 1410 or PMIC 1412. In an example, any one of PCU 1410 or PMIC 1412 may be absent in device 1400, and hence, these components are illustrated using dotted lines.

Various power management operations of device 1400 may be performed by PCU 1410, by PMIC 1412, or by a combination of PCU 1410 and PMIC 1412. For example, PCU 1410 and/or PMIC 1412 may select a power state (e.g., P-state) for various components of device 1400. For example, PCU 1410 and/or PMIC 1412 may select a power state (e.g., in accordance with the ACPI (Advanced Configuration and Power Interface) specification) for various components of device 1400. Merely as an example, PCU 1410 and/or PMIC 1412 may cause various components of the device 1400 to transition to a sleep state, to an active state, to an appropriate C state (e.g., C0 state, or another appropriate C state, in accordance with the ACPI specification), etc. In an example, PCU 1410 and/or PMIC 1412 may control a voltage output by VR 1414 and/or a frequency of a clock signal output by the clock generator, e.g., by outputting the VID signal and/or the FID signal, respectively. In an example, PCU 1410 and/or PMIC 1412 may control battery power usage, charging of battery 1418, and features related to power saving operation.

The clock generator 1416 can comprise a phase locked loop (PLL), frequency locked loop (FLL), or any suitable clock source. In some embodiments, each core of processor 1404 has its own clock source. As such, each core can operate at a frequency independent of the frequency of operation of the other core. In some embodiments, PCU 1410 and/or PMIC 1412 performs adaptive or dynamic frequency scaling or adjustment. For example, clock frequency of a processor core can be increased if the core is not operating at its maximum power consumption threshold or limit. In some embodiments, PCU 1410 and/or PMIC 1412 determines the operating condition of each core of a processor, and opportunistically adjusts frequency and/or power supply voltage of that core without the core clocking source (e.g., PLL of that core) losing lock when the PCU 1410 and/or PMIC 1412 determines that the core is operating below a target performance level. For example, if a core is drawing current from a power supply rail less than a total current allocated for that core or processor 1404, then PCU 1410 and/or PMIC 1412 can temporarily increase the power draw for that core or processor 1404 (e.g., by increasing clock frequency and/or power supply voltage level) so that the core or processor 1404 can perform at higher performance level. As such, voltage and/or frequency can be increased temporarily for processor 1404 without violating product reliability.

In an example, PCU 1410 and/or PMIC 1412 may perform power management operations, e.g., based at least in part on receiving measurements from power measurement circuitries 1442, temperature measurement circuitries 1440, charge level of battery 1418, and/or any other appropriate information that may be used for power management. To that end, PMIC 1412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 1410 and/or PMIC 1412 in at least one embodiment to allow PCU 1410 and/or PMIC 1412 to manage processor core energy at least in part based on value(s) detected by one or more of the sensors.

Also illustrated is an example software stack of device 1400 (although not all elements of the software stack are illustrated). Merely as an example, processors 1404 may execute application programs 1450, Operating System 1452, one or more Power Management (PM) specific application programs (e.g., generically referred to as PM applications 1458), and/or the like. PM applications 1458 may also be executed by the PCU 1410 and/or PMIC 1412. OS 1452 may also include one or more PM applications 1456a, 1456b, 1456c. The OS 1452 may also include various drivers 1454a, 1454b, 1454c, etc., some of which may be specific for power management purposes. In some embodiments, device 1400 may further comprise a Basic Input/output System (BIOS) 1420. BIOS 1420 may communicate with OS 1452 (e.g., via one or more drivers 1454a-c), communicate with processors 1404, etc.

For example, one or more of PM applications 1458, 1456a-c, drivers 1454a-c, BIOS 1420, etc. may be used to implement power management specific tasks, e.g., to control voltage and/or frequency of various components of device 1400, to control wake-up state, sleep state, and/or any other appropriate power state of various components of device 1400, control battery power usage, charging of the battery 1418, features related to power saving operation, etc.

In some embodiments, battery 1418 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 1410a/b has a capability to enable extra compute and telemetries resources for the runtime support of the pCode. Here pCode refers to a firmware executed by PCU 1410a/b to manage performance of the circuit 1401. For example, pCode may set frequencies and appropriate voltages for the processor. Part of the pCode are accessible via OS 1452. In various embodiments, mechanisms and methods are provided that dynamically change an Energy Performance Preference (EPP) value based on workloads, user behavior, and/or system conditions. There may be a well-defined interface between OS 1452 and the pCode. The interface may allow or facilitate the software configuration of several parameters and/or may provide hints to the pCode. As an example, an EPP parameter may inform a pCode algorithm as to whether performance or battery life is more important.

This support may be provided as well by the OS 1452 by including machine-learning support as part of OS 1452 and either tuning the EPP value that the OS hints to the hardware (e.g., various components of circuit 1401) by machine-learning prediction, or by delivering the machine-learning prediction to the pCode in a manner similar to that done by a Dynamic Tuning Technology (DTT) driver. In this model, OS 1452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 1452 and the other from software such as DTT, and may selectively choose to provide higher performance and/or responsiveness. As part of this method, the pCode may enable in the DTT an option to tune its reaction for the DTT for different types of activity.

Some non-limiting Examples of various embodiments are presented below.

Example 1 includes an apparatus, comprising: a transistor comprising a first terminal coupled to a battery charger and a second terminal coupled to a Universal Serial Bus (USB) port; and a controller coupled to the battery charger, wherein the controller is to cause the battery charger to limit current through the transistor to a first current limit during a wait period and, upon completion of the wait period, is to cause the battery charger to limit current through the transistor to a second current limit, greater than the first current limit.

Example 2 includes the apparatus of Example 1, further comprising a power delivery manager coupled to the USB port and to the controller, wherein the power delivery manager is to negotiate with an external power source to supply current according to the second current limit.

Example 3 includes the apparatus of Example 1 or 2, wherein the wait period is for an output voltage of the transistor to equalize with an input voltage of the transistor.

Example 4 includes the apparatus of any one of Examples 1-3, wherein the wait period is to avoid a thermal trip of the transistor.

Example 5 includes the apparatus of any one of Examples 1-4, wherein the wait period is at least 50 ms.

Example 6 includes the apparatus of any one of Examples 1-5, wherein the controller is to determine whether the apparatus is in a reduced power state and to delay booting of the apparatus until the completion of the wait period if the apparatus is in the reduced power state.

Example 7 includes the apparatus of Example 6, wherein the controller is to boot the apparatus to a fully awake state if the apparatus is in the reduced power state and, to boot the apparatus to the fully awake state, the controller is to deassert a low battery signal.

Example 8 includes the apparatus of Example 6 or 7, wherein the reduced power state comprises a sleep state or shutdown state.

Example 9 includes the apparatus of any one of Examples 1-8, further comprising a temperature sensor, wherein the controller is to adjust the wait period based on the temperature sensor.

Example 10 includes the apparatus of any one of Examples 1-9, further comprising at least one of an integrated circuit, a System on Chip, a System in Package or a computing device in which the transistor and controller are provided.

Example 11 includes an apparatus, comprising: a transistor comprising a first terminal coupled to a battery charger and a second terminal coupled to a Universal Serial Bus (USB) port; and a controller coupled to the battery charger, wherein the controller is to: cause the battery charger to limit current through the transistor to a first current limit; enable the transistor; start a wait period; and re-enable the transistor in response to a determination during the wait period that an external power source is to provide the power to the port in an extended power range.

Example 12 includes the apparatus of Example 11, wherein upon completion of the wait period, the controller is to cause the battery charger to limit current through the transistor to a second current limit, greater than the first current limit.

Example 13 includes the apparatus of Example 12, further comprising a power delivery manager coupled to the USB port and to the controller, wherein the power delivery manager is to negotiate with an external power source to supply current according to the second current limit, and to supply the power according to the Extended Power Range.

Example 14 includes the apparatus of any one of Examples 11-13, further comprising a power delivery manager coupled to the USB port and to the controller, wherein the power delivery manager is to turn off the transistor during the wait period in response to accepting a contract for power in the Extended Power Range from the external power source.

Example 15 includes the apparatus of any one of Examples 11-14, wherein the enabling of the transistor is in response to a ready message from the external power source to provide the power in a power range which is less than the extended power range.

Example 16 includes one or more non-transitory machine-readable storage media having machine readable instructions stored thereon that when executed cause one or more machines to: determine that a battery coupled to a battery charger has a charge level below a threshold, wherein the battery charged is coupled to a Universal Serial Bus (USB) port via a switch; and in response to the determining that the battery has the charge level below the threshold: turn on the switch to allow the battery charger to receive power; turn off the switch in response to accepting a contract to receive power in a first power range; turn on the switch in response to receipt of a first power range ready message; turn off the switch in response to accepting a contract to receive power in a second power range which is greater than the first power range; and turn on the switch in response to receipt of a second power range ready message.

Example 17 includes the one or more non-transitory machine-readable storage media of Example 16, wherein the battery charger is to receive power via the switch and to charge the battery.

Example 18 includes the one or more non-transitory machine-readable storage media of Example 16 or 17, wherein the turning off of the switch in response to accepting the contract to receive power in the first power range and the turning off of the switch in response to accepting the contract to receive power in the second power range keep a power consumption below a maximum allowed power consumption.

Example 19 includes the one or more non-transitory machine-readable storage media of any one of Examples 16-18, wherein the machine readable instructions when executed cause one or more machines to: cause the battery charger to limit current through the switch to a first current limit during a wait period which starts with the turning on of the switch in response to receipt of the second power range ready message; and cause the battery charger to limit current through the switch to a second current limit, which is greater than the first current limit, upon completion of the wait period.

Example 20 includes the one or more non-transitory machine-readable storage media of Example 19, wherein the first current limit is defined by an implicit power contract with an external power source and the second current limited is defined according to a negotiation with the external power source.

Example 21 includes a method, comprising: determining that an external power source is coupled to a port and ready to provide power to the port; in response to the determining, causing the battery charger to limit current through the transistor to a first current limit during a wait period; and upon completion of the wait period, causing the battery charger to limit current through the transistor to a second current limit, greater than the first current limit.

Example 22 includes the method of Example 21, further comprising negotiating with the external power source to supply current according to the second current limit.

Example 23 includes the method of Example 21 or 22, further comprising: determining whether a reduced power state is set; and delaying booting until the completion of the wait period if reduced power state is set.

Example 24 includes the method of any one of Examples 21-23, further comprising booting to a fully awake state if the reduced power state is set, including deasserting a low battery signal.

Example 25 includes the method of any one of Examples 21-24, further comprising adjusting the wait period based on a sensed temperature.

Example 26 includes a non-transitory machine-readable storage including machine-readable instructions that, when executed, cause a processor or other circuit or computing device to implement the method of any one of Examples 21-25.

Example 27 includes a computer program comprising instructions which, when the program is executed by a computer, cause the computer to carry out the method of any one of Examples 21-25.

Example 28 includes a method, comprising: causing a battery charger to limit current through a transistor to a first current limit; enabling the transistor; starting a wait period; and re-enabling the transistor in response to determining during the wait period that an external power source is to provide power to a port in an extended power range.

Example 29 includes the method of Example 28, further comprising negotiating with the external power source to supply current according to the second current limit, and supplying the power according to the Extended Power Range.

Example 30 includes the method of Example 28 or 29, further comprising turning off the transistor during the wait period in response to accepting a contract for power in the extended power range from the external power source.

Example 31 includes a non-transitory machine-readable storage including machine-readable instructions that, when executed, cause a processor or other circuit or computing device to implement the method of any one of Examples 28-30.

Example 32 includes a computer program comprising instructions which, when the program is executed by a computer, cause the computer to carry out the method of any one of Examples 28-30.

Example 33 comprises a method, comprising: turning on a switch to allow a battery charger to receive power from an external power source; turning off the switch in response to accepting a contract to receive power in a first power range from the external power source coupled to the port; turning on the switch in response to receipt of a first power range ready message from the external power source; turning off the switch in response to accepting a contract to receive power in a second power range which is greater than the first power range from the external power source; and turning on the switch in response to receipt of a second power range ready message from the external power source.

Example 34 includes the method of Example 33, further comprising: causing the battery charger to limit current through the switch to a first current limit during a wait period which starts with the turning on of the switch in response to receipt of the second power range ready message; and causing the battery charger to limit current through the switch to a second current limit, which is greater than the first current limit, upon completion of the wait period.

Example 35 includes a computer program comprising instructions which, when the program is executed by a computer, cause the computer to carry out the method of Example 33 or 34.

Example 1a is a method to be performed by an embedded controller (EC) of a computing system, one or more elements of an EC, and/or an electronic device that includes or implements an EC, wherein the method comprises: identifying that the system has been coupled with a power source by a universal serial bus (USB) Type-C (USB-C) port of the system; identifying, based on the identification that the system has been coupled with the power source, a power state of the system; identifying one or more voltage parameters related to a field effect transistor (FET) communicatively coupled with the USB-C port; and identifying, based on one or more of the coupling with the power source, the power state of the system, and the one or more voltage parameters, a charger input-limit current.

Example 2a includes the method of example 1a, and/or some other example herein, wherein the FET is a metal-oxide-semiconductor FET (MOSFET).

Example 3a includes the method of any of examples 1a-2a, and/or some other example herein, wherein the power state is an Sx state, a dead battery state, or a low battery state.

Example 4a includes the method of any of examples 1a-3a, and/or some other example herein, further comprising limiting current received from the USB-C port based on the identified charger input-limit current.

Example 5a includes the method of any of examples 1a-4a, and/or some other example herein, wherein the charger input-limit current is related to not thermally or electrically damaging the FET.

Example 6a includes the method of any of examples 1a-5a, and/or some other example herein, further comprising: identifying that an output voltage parameter of the FET meets a pre-negotiated value; and switching from the charger input-limit current to a power data object (PDO) current limit.

Example 7a includes the method of example 6a, and/or some other example herein, wherein the PDO current limit is based on a previous negotiation with an electrical device coupled with the USB-C port.

Example 8a includes the method of example 6a, and/or some other example herein, wherein the pre-negotiated value is related to an input voltage value of the FET.

Example Z01 may include an apparatus comprising means to perform one or more elements of a method described in or related to any of the examples herein, and/or any other method, process, or technique process described herein, or portions or parts thereof.

Example Z02 may include an apparatus comprising logic, modules, or circuitry to perform one or more elements of a method described in or related to any of the examples herein, and/or any other method, process, or technique described herein, or portions or parts thereof.

Example Z03 may include a method, technique, or process as described in or related to any of the examples herein, and/or any other method, process, or technique described herein, or portions or parts thereof.

Example Z04 may include a signal as described in or related to any of the examples herein, and/or any other method, process, or technique described herein, or portions or parts thereof.

Example Z05 may include an apparatus comprising one or more processors and tangible, non-transitory computer-readable media that include instructions which, when executed by the one or more processors, are to cause the apparatus to perform one or more elements of a method described in or related to any of the examples herein, and/or any other method, process, or technique described herein, or portions or parts thereof.

Example Z06 may include one or more non-transitory computer readable media comprising instructions that, upon execution of the instructions by one or more processors of an electronic device, are to cause the electronic device to perform one or more elements of a method described in or related to any of the examples herein, and/or any other method, process, or technique described herein, or portions or parts thereof.

Example Z07 may include a computer program related to one or more elements of a method described in or related to any of the examples herein, and/or any other method, process, or technique described herein, or portions or parts thereof.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a transistor comprising a first terminal coupled to a battery charger and a second terminal coupled to a Universal Serial Bus (USB) port; and
a controller coupled to the battery charger, wherein the controller is to cause the battery charger to limit current through the transistor to a first current limit during a wait period and, upon completion of the wait period, is to cause the battery charger to limit current through the transistor to a second current limit, greater than the first current limit.

2. The apparatus of claim 1, further comprising a power delivery manager coupled to the USB port and to the controller, wherein the power delivery manager is to negotiate with an external power source to supply current according to the second current limit.

3. The apparatus of claim 1, wherein the wait period is for an output voltage of the transistor to equalize with an input voltage of the transistor.

4. The apparatus of claim 1, wherein the wait period is to avoid a thermal trip of the transistor.

5. The apparatus of claim 1, wherein the wait period is at least 50 ms.

6. The apparatus of claim 1, wherein the controller is to determine whether the apparatus is in a reduced power state and to delay booting of the apparatus until the completion of the wait period if the apparatus is in the reduced power state.

7. The apparatus of claim 6, wherein the controller is to boot the apparatus to a fully awake state if the apparatus is in the reduced power state and, to boot the apparatus to the fully awake state, the controller is to deassert a low battery signal.

8. The apparatus of claim 6, wherein the reduced power state comprises a sleep state or shutdown state.

9. The apparatus of claim 1, further comprising a temperature sensor, wherein the controller is to adjust the wait period based on the temperature sensor.

10. The apparatus of claim 1, further comprising at least one of an integrated circuit, a System on Chip, a System in Package or a computing device in which the transistor and controller are provided.

11. An apparatus, comprising:
a transistor comprising a first terminal coupled to a battery charger and a second terminal coupled to a Universal Serial Bus (USB) port; and
a controller coupled to the battery charger, wherein the controller is to:
cause the battery charger to limit current through the transistor to a first current limit;
enable the transistor;
start a wait period; and
re-enable the transistor in response to a determination during the wait period that an external power source is to provide the power to the USB port in an extended power range.

12. The apparatus of claim 11, wherein upon completion of the wait period, the controller is to cause the battery charger to limit current through the transistor to a second current limit, greater than the first current limit.

13. The apparatus of claim 12, further comprising a power delivery manager coupled to the USB port and to the controller, wherein the power delivery manager is to negotiate with an external power source to supply current according to the second current limit, and to supply the power according to the extended power range.

14. The apparatus of claim 11, further comprising a power delivery manager coupled to the USB port and to the controller, wherein the power delivery manager is to turn off the transistor during the wait period in response to accepting a contract for power in the extended power range from the external power source.

15. The apparatus of claim 11, wherein the enabling of the transistor is in response to a ready message from the external power source to provide the power in a power range which is less than the extended power range.

16. One or more non-transitory machine-readable storage media having machine readable instructions stored thereon that when executed cause one or more machines to:
determine that a battery coupled to a battery charger has a charge level below a threshold, wherein the battery charged is coupled to a Universal Serial Bus (USB) port via a switch; and
in response to the determining that the battery has the charge level below the threshold:
turn on the switch to allow the battery charger to receive power;
turn off the switch in response to accepting a contract to receive power in a first power range;
turn on the switch in response to receipt of a first power range ready message;
turn off the switch in response to accepting a contract to receive power in a second power range which is greater than the first power range; and
turn on the switch in response to receipt of a second power range ready message.

17. The one or more non-transitory machine-readable storage media of claim 16, wherein the battery charger is to receive power via the switch and to charge the battery.

18. The one or more non-transitory machine-readable storage media of claim 16, wherein the turning off of the switch in response to accepting the contract to receive power in the first power range and the turning off of the switch in response to accepting the contract to receive power in the second power range keep a power consumption below a maximum allowed power consumption.

19. The one or more non-transitory machine-readable storage media of claim 16, wherein the machine readable instructions when executed cause one or more machines to:
cause the battery charger to limit current through the switch to a first current limit during a wait period which starts with the turning on of the switch in response to receipt of the second power range ready message; and
cause the battery charger to limit current through the switch to a second current limit, which is greater than the first current limit, upon completion of the wait period.

20. The one or more non-transitory machine-readable storage media of claim 19, wherein the first current limit is defined by an implicit power contract with an external power source and the second current limited is defined according to a negotiation with the external power source.

* * * * *